(12) United States Patent
Zhao et al.

(10) Patent No.: US 12,488,848 B2
(45) Date of Patent: Dec. 2, 2025

(54) READ PARAMETER ZONING

(71) Applicant: Sandisk Technologies, Inc., Milpitas, CA (US)

(72) Inventors: Sixiang Zhao, Shanghai (CN); Jing Yin, Shanghai (CN); Ming Wang, Shanghai (CN); Liang Li, Shanghai (CN)

(73) Assignee: Sandisk Technologies, Inc., Milpitas, CA (US)

( * ) Notice: Subject to any disclaimer, the term of this patent is extended or adjusted under 35 U.S.C. 154(b) by 174 days.

(21) Appl. No.: 18/598,656

(22) Filed: Mar. 7, 2024

(65) Prior Publication Data

US 2025/0285687 A1    Sep. 11, 2025

(51) Int. Cl.
*G11C 7/00* (2006.01)
*G11C 16/08* (2006.01)
*G11C 16/26* (2006.01)
*G11C 16/34* (2006.01)

(52) U.S. Cl.
CPC .......... *G11C 16/3459* (2013.01); *G11C 16/08* (2013.01); *G11C 16/26* (2013.01)

(58) Field of Classification Search
CPC ....... G11C 7/22; G11C 7/1072; G11C 7/1006; G11C 7/1066

USPC .................................................. 365/189.15
See application file for complete search history.

(56) References Cited

U.S. PATENT DOCUMENTS

| | | | |
|---|---|---|---|
| 9,244,763 B1 | 1/2016 | Kankani et al. | |
| 10,289,341 B2 | 5/2019 | Kirshenbaum et al. | |
| 10,379,739 B1 | 8/2019 | Bazarsky et al. | |
| 10,991,444 B1 | 4/2021 | Bazarsky et al. | |
| 11,385,802 B2 | 7/2022 | Sharon et al. | |
| 2015/0332777 A1* | 11/2015 | Yoon .................. | G11C 11/5642 365/185.12 |
| 2017/0162270 A1* | 6/2017 | Park .................. | G11C 29/021 |
| 2023/0393758 A1 | 12/2023 | Lang et al. | |

* cited by examiner

*Primary Examiner* — Son T Dinh
(74) *Attorney, Agent, or Firm* — Pearl Cohen Zedek Latzer Baratz LLP

(57) ABSTRACT

Technology for zoned read parameters. The read parameters may include read reference levels and/or offsets applied to base read reference levels. The memory system may assign memory cells located in a region (e.g., block) into zones based on a ranking of a target read level for each set of memory cells in the region. The memory system may assign word lines in a block into zones based on a ranking of a target read voltage and/or target read voltage offset for each word line. The memory system may read each particular set of memory cells (e.g., word line in the block) using a representative read voltage for the zone into which the particular word line is assigned.

20 Claims, 19 Drawing Sheets

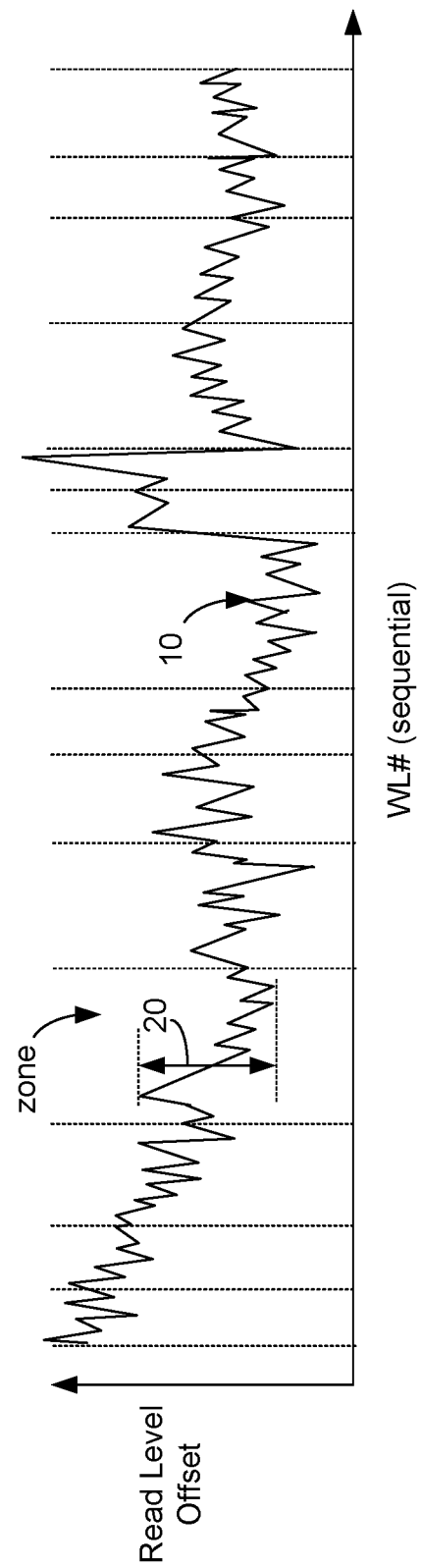

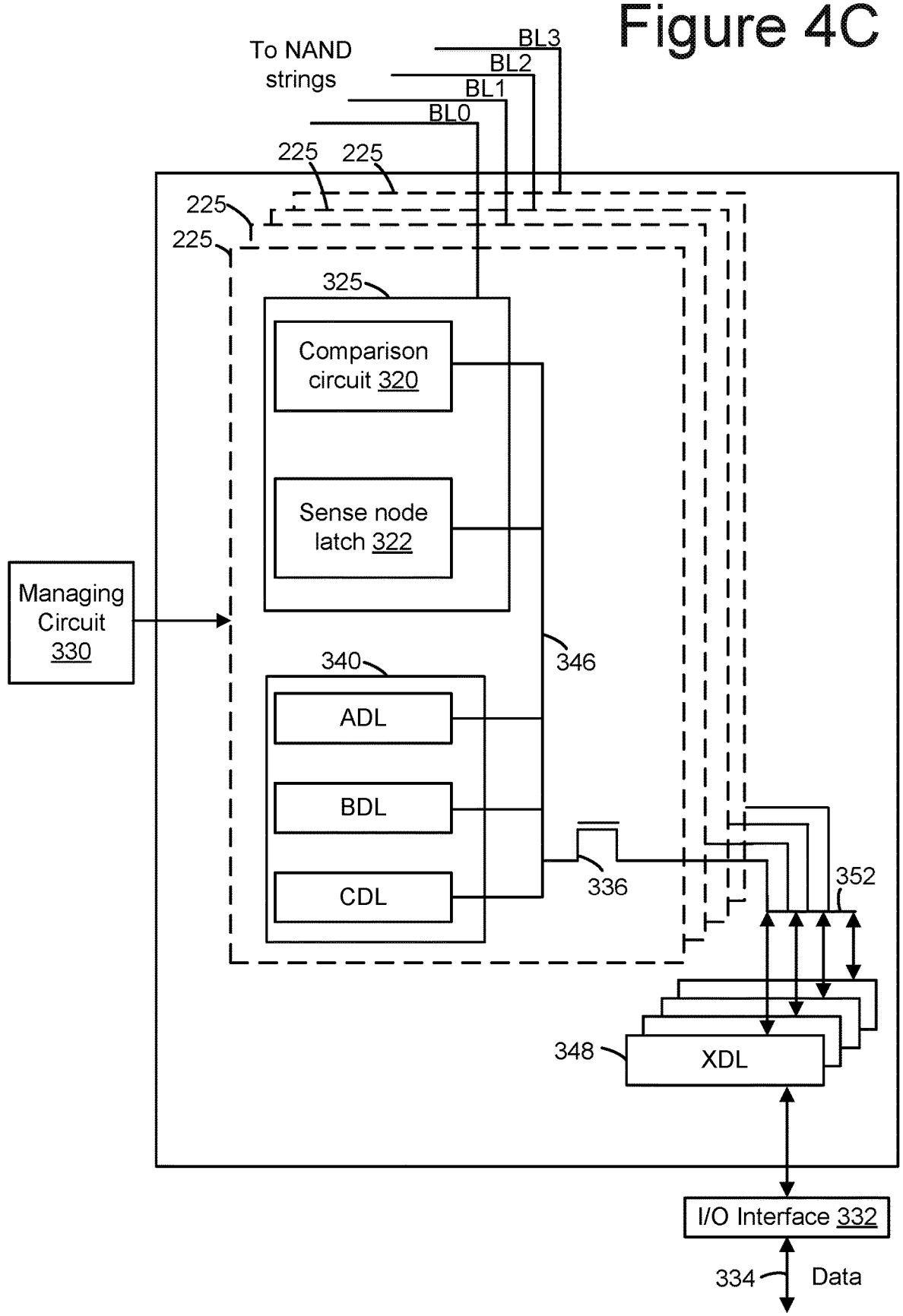

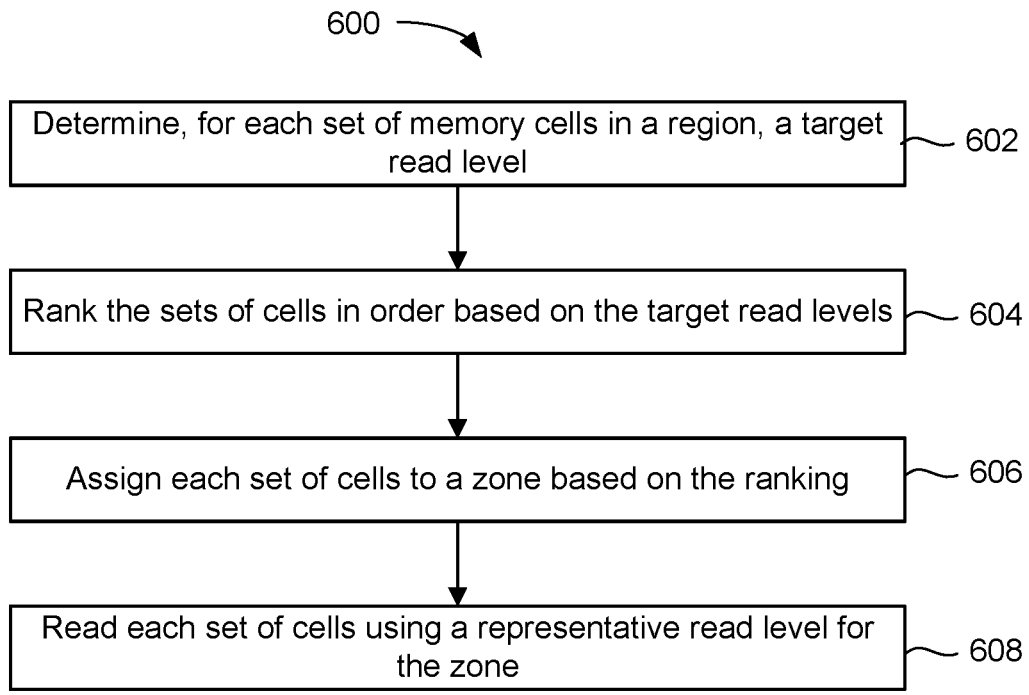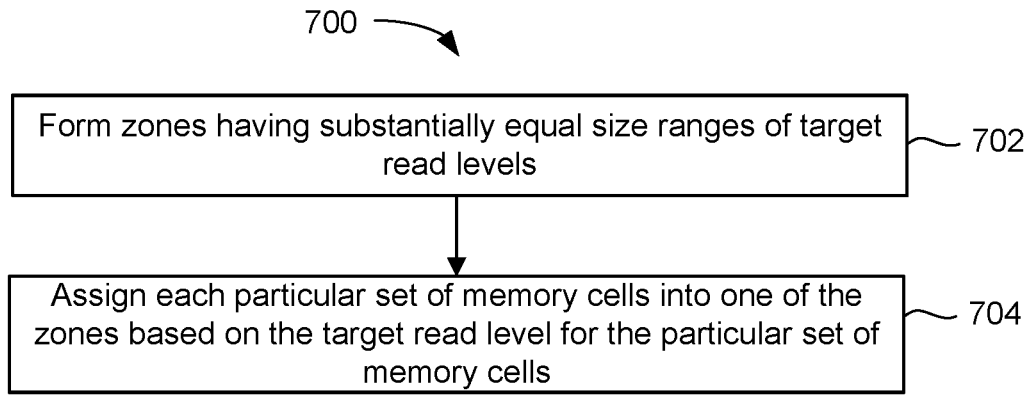

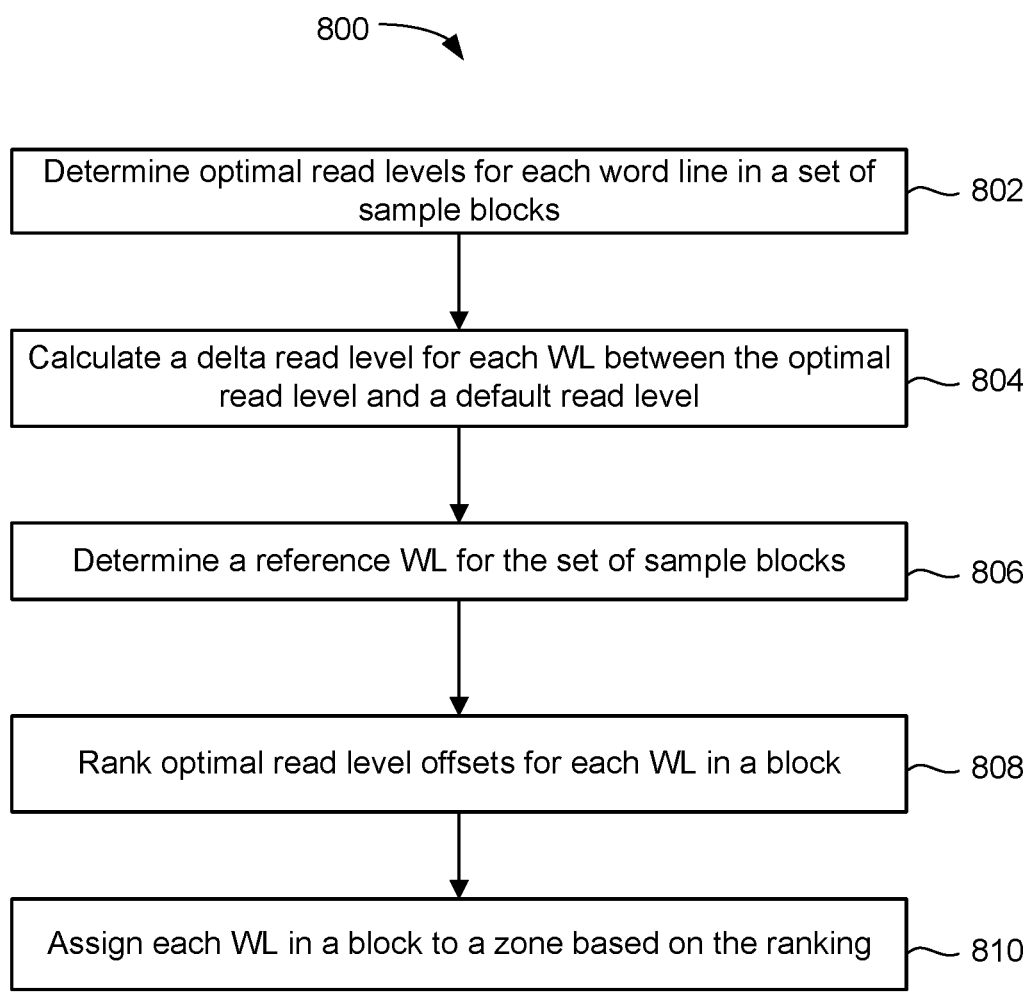

Figure 12A

| Zone# 1202 | Physical zoning 1204 | Read Level Gap (PZ) 1206 |
|---|---|---|
| ... | ... | ... |
| 4 | 22 - 41 | 2.4 |
| 5 | 42 - 66 | 2 |
| 6 | 67 - 85 | 2.9 |
| 7 | 86 - 96 | 3.1 |
| ... | ... | ... |

Figure 12B

| Zone# 1212 | Offset ranked zoning 1208 | Read Level Gap (RZ) 1210 | Representative Zone Offset 1220 |
|---|---|---|---|
| ... | ... | ... | ... |
| 4 | 81, 208, 87, 200, 187, 193, 214 ... | 0.3 | |
| 5 | 198, 199, 91, 186, 149, 88, 190 ... | 0.3 | |
| 6 | 205, 78, 215, 203, 77, 114, 73, ... | 0.3 | |
| 7 | 153, 118, 74, 134, 184, 171, 112,... | 0.3 | |
| ... | ... | ... | ... |

1300

READ PARAMETER ZONING

BACKGROUND

The present disclosure relates to non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. Herein, a memory system that uses non-volatile memory for storage may be referred to as a storage system. The memory structure may be three-dimensional (3D). One type of 3D structure has non-volatile memory cells arranged as vertical NAND strings. The 3D memory structure may be arranged into units that are commonly referred to as physical blocks. For example, a physical block in a NAND memory system contains many NAND strings. A NAND string contains memory cell transistors connected in series, a drain side select gate at one end, and a source side select gate at the other end. Each NAND string is associated with a bit line. The physical block typically has many word lines that provide voltages to the control gates of the memory cell transistors. In some architectures, each word line connects to the control gate of one memory cell on each respective NAND string in the physical block.

The memory cells are programmed one group at a time. The unit of programming is typically referred to as a page. Typically, the memory cells are programmed to a number of data states. Using a greater number of data states allows for more bits to be stored per memory cell. For example, four data states may be used to store two bits per memory cell, eight data states may be used in order to store three bits per memory cell, 16 data states may be used to store four bits per memory cell, etc. Some memory cells may be programmed to a data state by storing charge in the memory cell. For example, the threshold voltage (Vt) of a NAND memory cell can be set to a target Vt by programming charge into a charge storage region such as a charge trapping layer. The amount of charge stored in the charge trapping layer establishes the Vt of the memory cell.

One type of three-dimensional memory structure has alternating dielectric layers and conductive layers in a stack. NAND strings are formed vertically in the alternating dielectric layers and conductive layers in what may be referred to as memory holes. For example, after memory holes are drilled into the stack of alternating dielectric layers and conductive layers, the memory holes are filled in with layers of materials including a charge-trapping material to create a vertical column of memory cells (e.g., NAND string). The semiconductor fabrication process for forming a three-dimensional memory structure may result in location dependent physical differences between similar structures.

The non-volatile memory cells may be programmed to store data. Typically, the memory cells are programmed to a number of data states. Using two data states to store a single bit per cell is referred to herein as SLC programming. Using a greater number of data states allows for more bits to be stored per memory cell. Using additional data states to store two or more bits per cell is referred to herein as multi-bit per cell programming. For example, four data states may be used to store two bits per memory cell (MLC), eight data states may be used in order to store three bits per memory cell (TLC), 16 data states may be used to store four bits per memory cell (QLC), etc.

FIG. 1A is a graph of threshold voltage versus number of memory cells, and illustrates example threshold voltage distributions when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. FIG. 1A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 1A depicts read reference voltage Vr. By testing (e.g., performing one or more sense operations) whether the threshold voltage of a given memory cell is above or below Vr, the system can determine whether a memory cells is erased (state E) or programmed (state P). FIG. 1A also depicts program verify reference voltage Vv. In some embodiments, when programming memory cells to data state P, the system will test whether those memory cells have a threshold voltage greater than or equal to Vv.

Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example of FIG. 1B, each memory cell stores three bits of data.

FIG. 1B shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells.

FIG. 1B shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in. FIG. 1B also shows a number of verify reference voltages. The verify reference voltages are VvA, VvB, VvC, VvD, VvE, VvF, and VvG.

The optimal read reference voltages tend to differ between memory cells. For example, the optimal magnitude for VvA, VvB, VvC, VvD, VvE, VvF, and/or VvG can differ between memory cells. Some memory systems store different read reference voltages for different groups of memory cells. Storing different read reference voltages for different groups of memory cells can improve read accuracy. Also reading speed may be improved by not having to dynamically determine optimum read levels at the time of read. However, to reduce the memory necessary to store such operating parameters and to reduce computing requirements necessary to apply such read parameters multiple groups of memory cells share the same read reference voltages. However, there can still be considerable variation between the groups that share the same read reference voltages. Therefore, many groups are not read using their optimal read reference voltages. Therefore, technical challenges remain in providing close to optimal read reference voltages for memory cells.

FIG. 2 depicts a plot 10 of a possible zoning of word lines based on physical location of the word lines in a block. The word lines are numbered sequentially in the block based on their physical location. FIG. 2 depicts 14 WL zones with each zone containing word lines that are a physically contiguous group. The zones are divided by dashed vertical lines. The plot 10 indicates hypothetical read level offsets for the word lines. Even with a relatively large number of zones there can be a large gap in read level offsets between the word line having the lowest read level offset and the word line having the highest read level offset. For example, double sided arrow 20 shows a large voltage gap with a zone. For each zone only a single read level offset is used. Thus, the same read level offset is used for all word lines in a zone. Therefore, there can be a significant difference between the actual read level offset for a word line and the applied read level offset. This large gap can lead to read errors.

BRIEF DESCRIPTION OF THE DRAWINGS

Like-numbered elements refer to common components in the different figures.

FIG. 2 depicts a possible zoning of word lines based on physical location of the word lines in a block.

FIG. 4C is a block diagram depicting one embodiment of a portion of column control circuitry that contains a number of read/write circuits.

FIG. 6 is a flowchart of one embodiment of a process of operating a memory system using zoned read parameters.

FIG. 7 is a flowchart of one embodiment of a process of assigning memory cells into substantially equal sized zones.

FIG. 8 is a flowchart of one embodiment of a process of operating a memory system using zoned read parameters.

FIG. 12A a table that shows assigning read parameters based on physical location of word lines can result in large voltage gaps in the zones.

FIG. 12B is an embodiment of a table of zoned read parameters.

DETAILED DESCRIPTION

Technology is disclosed for zoned read parameters. The read parameters may include read reference levels and/or offsets applied to base read reference levels. An embodiment of a memory system assigns memory cells located in a region (e.g., block) of the memory system into zones based on a ranking of a target read level for each set of memory cells in the region. In an embodiment, the memory system assigns word lines in a block into zones based on a ranking of a target read voltage for each word line. Note that the target read voltage may be expressed as a target read voltage offset applied to a base read voltage, wherein the ranking may be of the target read voltage offsets of the word lines. The memory system may read each particular word line in the block using a representative read voltage for the zone into which the particular word line is assigned. The zones may have substantially equal size voltage ranges in target read voltages, with each zone covering a different range of target read voltages. Therefore, the range of read voltages for each zone may be relatively small. Therefore, the difference between the target read voltage for a particular word line and the representative read voltage for the zone into which the particular word line is assigned is small, thereby improving read accuracy.

Figure 3:
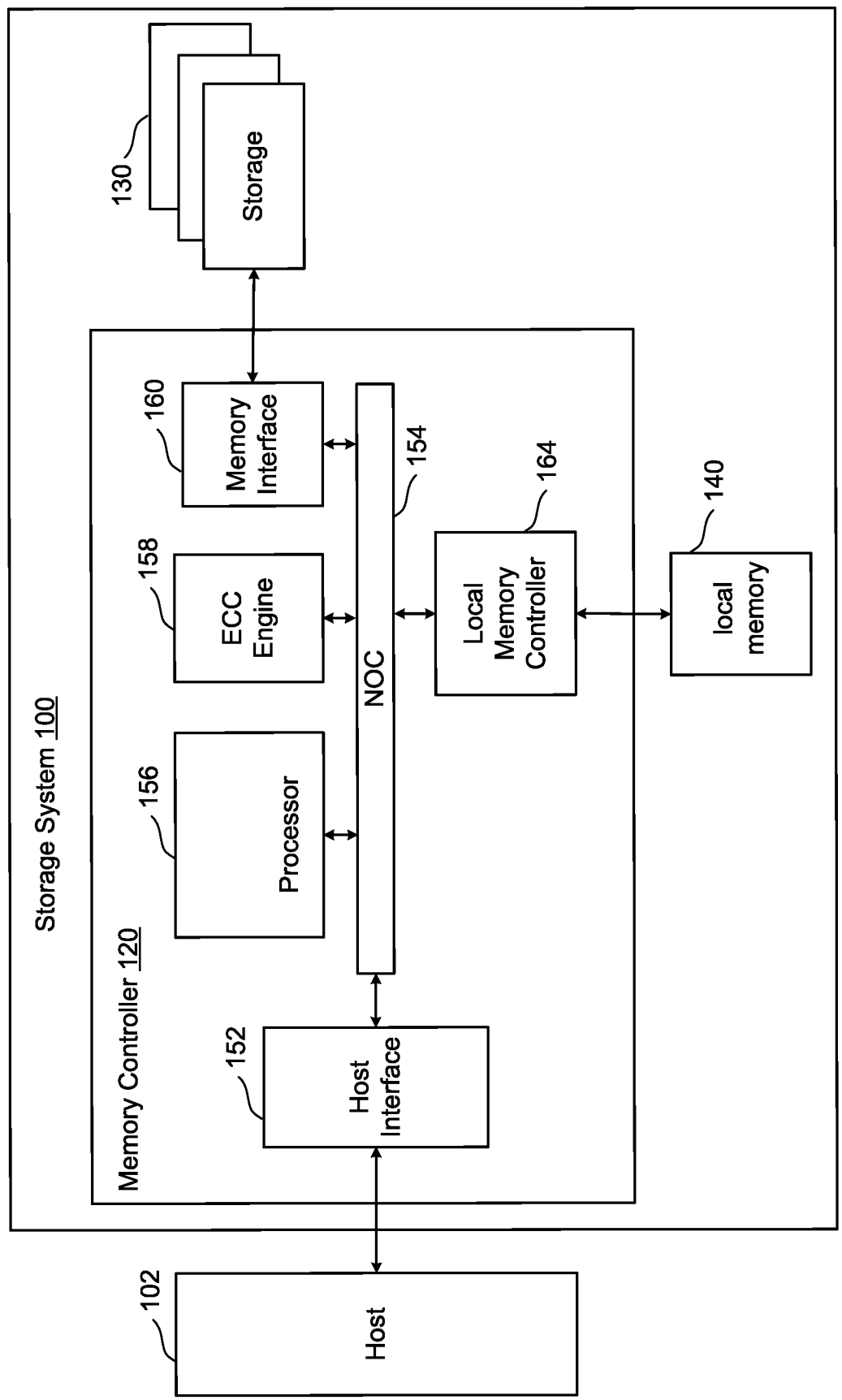
FIG. 3 is a block diagram depicting one embodiment of a storage system.

FIG. 3 is a block diagram of one embodiment of a storage system 100 that implements the technology described herein. In one embodiment, storage system 100 applies zoned read parameters when reading storage 130 as disclosed herein. In one embodiment, storage system 100 is a solid state drive ("SSD") system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 3 are electrical circuits. Storage system 100 includes a memory controller 120 (or storage controller) connected to non-volatile storage 130 and local high speed memory 140 (e.g., DRAM, SRAM, MRAM). Local memory 140 is non-transitory memory, which may include volatile memory or non-volatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a storage 130 and a subset of the L2P tables are cached (L2P cache) in the local high speed memory 140.

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 3A:
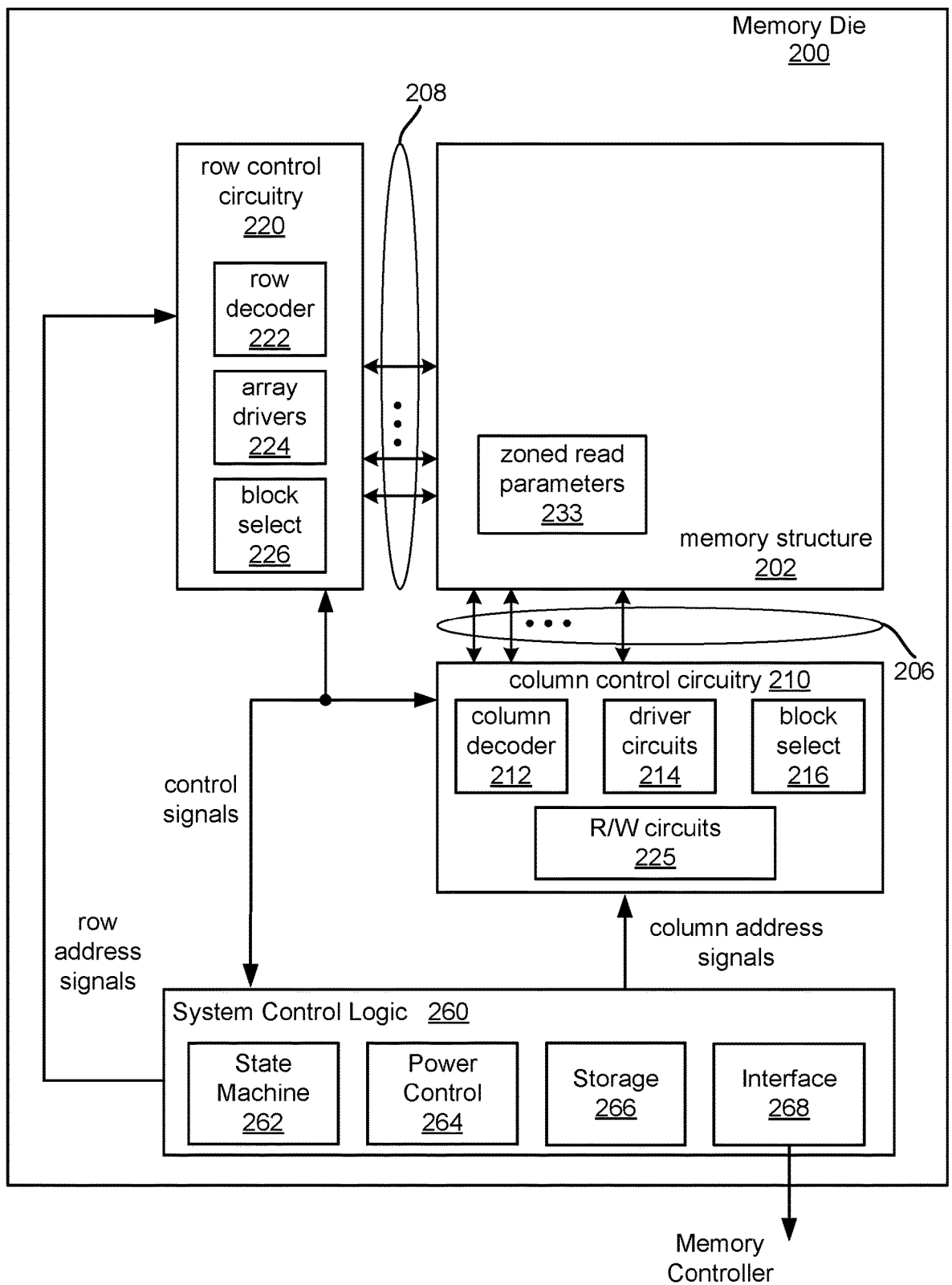
FIG. 3A is a block diagram of one embodiment of a memory die.

In one embodiment, non-volatile storage 130 comprises one or more memory dies. FIG. 3A is a functional block diagram of one embodiment of a memory die 200 that comprises non-volatile storage 130. Each of the one or more memory dies of non-volatile storage 130 can be implemented as memory die 200 of FIG. 3A. The components depicted in FIG. 3A are electrical circuits. Memory die 200 includes a memory structure 202 (e.g., memory array) that can comprise non-volatile memory cells (also referred to as non-volatile storage cells), as described in more detail below. The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuitry 216, as well as read/write circuitry, and I/O multiplexers. The system control logic 260, column control circuitry 210, and/or row control circuitry 220 are configured to control memory operations such as open block reads at the die level.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202.

Zoned read parameters 233 may be stored in the memory structure 202. The zoned read parameters 233 may be read into storage 266 to be used by the state machine 262 when reading memory cells in the memory structure 202. The zoned read parameters 233 may include read reference voltage offsets for different zones of memory cells. The zones may include memory cells that have similar read voltage offsets but are not required to be physically contiguous. Zoned read parameters 233 may be updated from time to time by performing processes including, but not limited to process 600, 700, 800, and/or 1100. In an embodiment, the memory structure 202 has blocks of memory cells, as will be discussed in further detail below. Each block may have a large number of word lines. Each word line may be assigned to a zone based on a target read voltage for that word line. Each zone may have a representative read voltage offset. Word lines having very similar target read voltages may be assigned to the same zone to thereby result in each word line being read at close to optimal read voltages. Reading may be accomplished by adding a base voltage to the read voltage offset for a zone to which the word line is assigned to arrive at a target read voltage. The target read voltage may then be applied to the word line.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 3A can be grouped into two parts: (1) memory structure 202 and (2) peripheral circuitry, which includes all of the other components depicted in FIG. 3A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 3A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 3B:
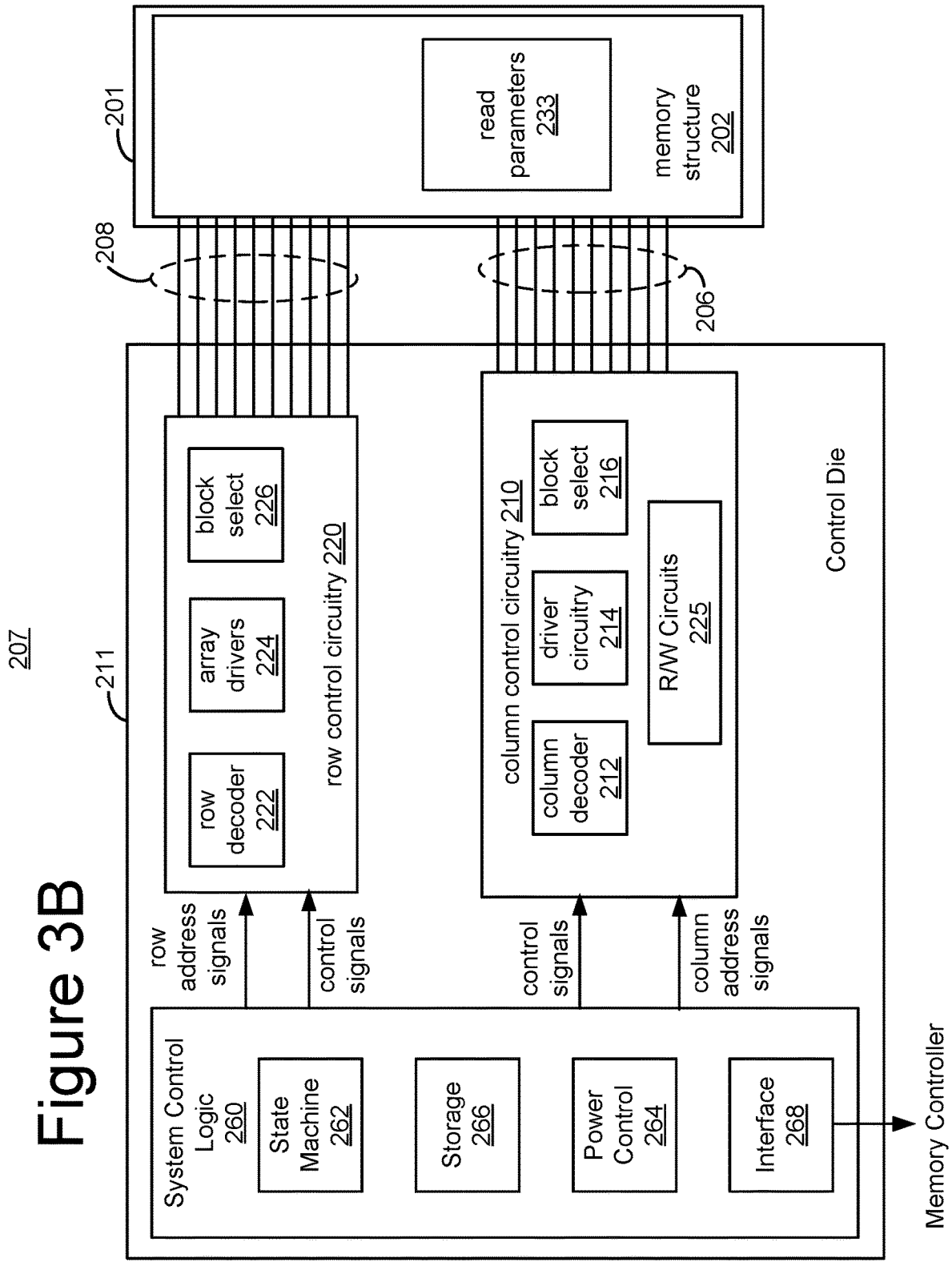
FIG. 3B is a block diagram of one embodiment of an integrated memory assembly.

FIG. 3B shows an alternative arrangement to that of FIG. 3A which may be implemented using wafer-to-wafer bonding to provide a bonded die pair. FIG. 3B depicts a functional block diagram of one embodiment of an integrated memory assembly 207. One or more integrated memory assemblies 207 may be used to implement the non-volatile storage 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 3B shows an example of the peripheral circuitry, including control circuits, formed in a peripheral circuit or control die 211 coupled to memory structure 202 formed in memory structure die 201. Common components are labelled similarly to FIG. 3A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 3B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and block select 216 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of memory controller 120, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, memory controller 120, storage 130, memory die 200, integrated memory assembly 207, and/or control die 211.

Figure 4A:
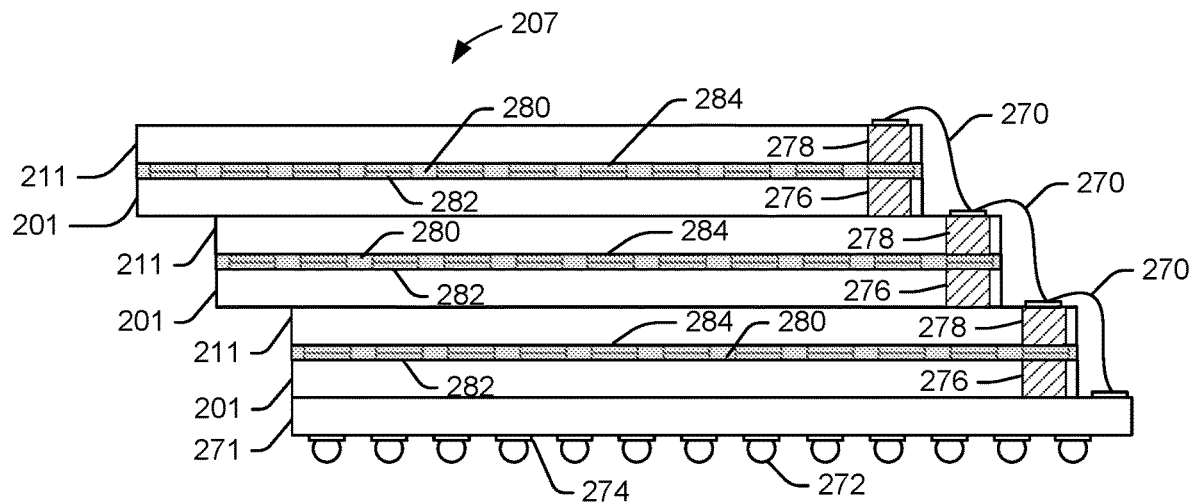
FIGS. 4A and 4B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 4A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 4A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 4A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 4B:
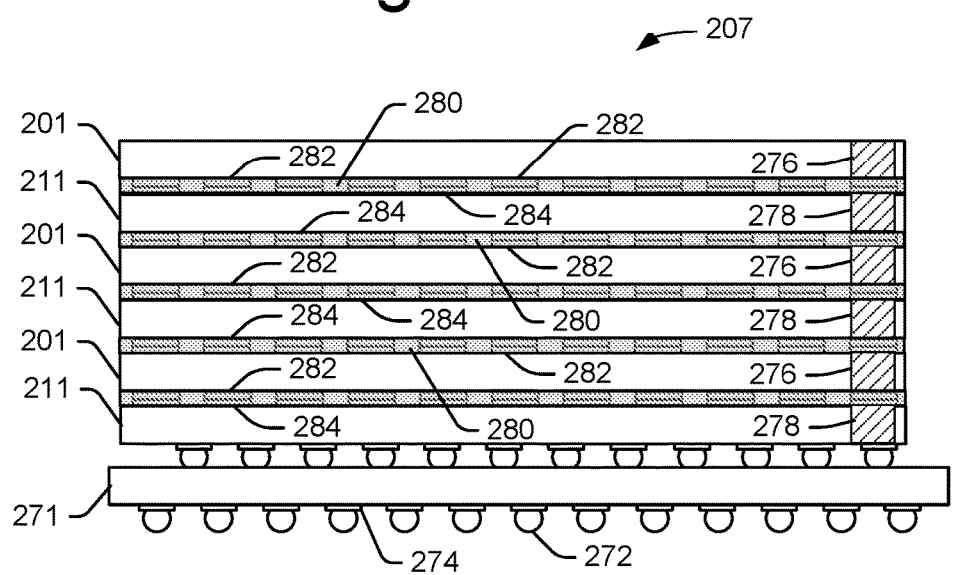

FIG. 4B depicts a side view of another embodiment of an integrated memory assembly 207 stacked on a substrate 271. The integrated memory assembly 207 of FIG. 4B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 4A, the integrated memory assembly 207 in FIG. 4B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

FIG. 4C is a block diagram depicting one embodiment of a portion of column control circuitry 210 that contains a number of read/write circuits 225. Each read/write circuit 225 is partitioned into a sense amplifier 325 and data latches 340. A managing circuit 330 controls the read/write circuits 225. The managing circuit 330 may communicate with state machine 262. In one embodiment, each sense amplifier 325 is connected to a respective bit line. Each bit line may be connected, at one point in time, to one of a large number of different NAND strings. A select gate on the NAND string may be used to connect the NAND string channel to the bit line.

Each sense amplifier 325 operates to provide voltages to one of the bit lines (see BL0, BL1, BL2, BL3) during program, verify, erase, and read operations. Sense amplifiers are also used to sense the condition (e.g., data state) of a memory cell in a NAND string connected to the bit line that connects to the respective sense amplifier.

Each sense amplifier 325 may have a sense node. During sensing, a sense node is charged up to an initial voltage, Vsense_init, such as 3V. The sense node is then connected to the bit line for a sensing time, and an amount of decay of the sense node is used to determine whether a memory cell is in a conductive or non-conductive state. The amount of decay of the sense node also indicates whether a current Icell in the memory cell exceeds a reference current, Iref. A larger decay corresponds to a larger current. If Icell<=Iref, the memory cell is in a non-conductive state and if Icell>Iref, the memory cell is in a conductive state. In an embodiment, the sense node has a capacitor that is pre-charged and then discharged for the sensing time.

In particular, the comparison circuit 320 determines the amount of decay by comparing the sense node voltage to a trip voltage after the sensing time. If the sense node voltage decays below the trip voltage, Vtrip, the memory cell is in a conductive state and its Vth is at or below the verify voltage. If the sense node voltage does not decay below Vtrip, the memory cell is in a non-conductive state and its Vth is above the verify voltage. A sense node latch 322 is set to 0 or 1, for example, by the comparison circuit 320 based on whether the memory cell is in a conductive or non-conductive state, respectively. The bit in the sense node latch 322 can also be used in a lockout scan to decide whether to set a bit line voltage to an inhibit or a program enable level in a next program loop. The bit in the sense node latch 322 can also be used in a lockout mode to decide whether to set a bit line voltage to a sense voltage or a lockout voltage in a read operation.

The data latches 340 are coupled to the sense amplifier 325 by a local data bus 346. The data latches 340 include three latches (ADL, BDL, CDL) for each sense amplifier 325 in this example. More or fewer than three latches may be included in the data latches 340. In one embodiment, for programming each data latch 340 is used to store one bit to be stored into a memory cell and for reading each data latch 340 is used to store one bit read from a memory cell. In a three bit per memory cell embodiment, ADL stores a bit for a lower page of data, BDL stores a bit for a middle page of data, CDL stores a bit for an upper page of data. Each read/write circuit 225 is connected to an XDL latch 348 by way of an XDL bus 352. In this example, transistor 336 connects local data bus 346 to XDL bus 352. An I/O interface 332 is connected to the XDL latches 348. The XDL latch 348 associated with a particular read/write circuit 225 serves as an interface latch for storing/latching data from the memory controller.

Managing circuit 330 performs computations, such as to determine the data stored in the sensed memory cell and store the determined data in the set of data latches. Each set of data latches 340 is used to store data bits determined by managing circuit 330 during a read operation, and to store data bits imported from the data bus 334 during a program operation which represent write data meant to be programmed into the memory. I/O interface 332 provides an interface between XDL latches 348 and the data bus 334.

During reading, the operation of the system is under the control of state machine 262 that controls the supply of different control gate voltages to the addressed memory cell. As it steps through the various predefined control gate voltages corresponding to the various memory states supported by the memory, the sense circuit may trip at one of these voltages and a corresponding output will be provided from the sense amplifier to managing circuit 330. At that point, managing circuit 330 determines the resultant memory state by consideration of the tripping event(s) of the sense circuit and the information about the applied control gate voltage from the state machine. It then computes a binary encoding for the memory state and stores the resultant data bits into data latches 340.

During program or verify operations for memory cells, the data to be programmed (write data) is stored in the set of data latches 340 from the data bus 334 by way of XDL latches 348. The program operation, under the control of the state machine 262, applies a series of programming voltage pulses to the control gates of the addressed memory cells. Each voltage pulse may be stepped up in magnitude from a previous program pulse by a step size in a process referred to as incremental step pulse programming. In one embodiment, each program voltage is followed by a verify operation to determine if the memory cells have been programmed to the desired memory state. In some cases, managing circuit 330 monitors the read back memory state relative to the desired memory state. When the two agree, managing circuit 330 sets the bit line in a program inhibit mode such as by updating its latches. This inhibits the memory cell coupled to the bit line from further programming even if additional program pulses are applied to its control gate.

Figure 5:
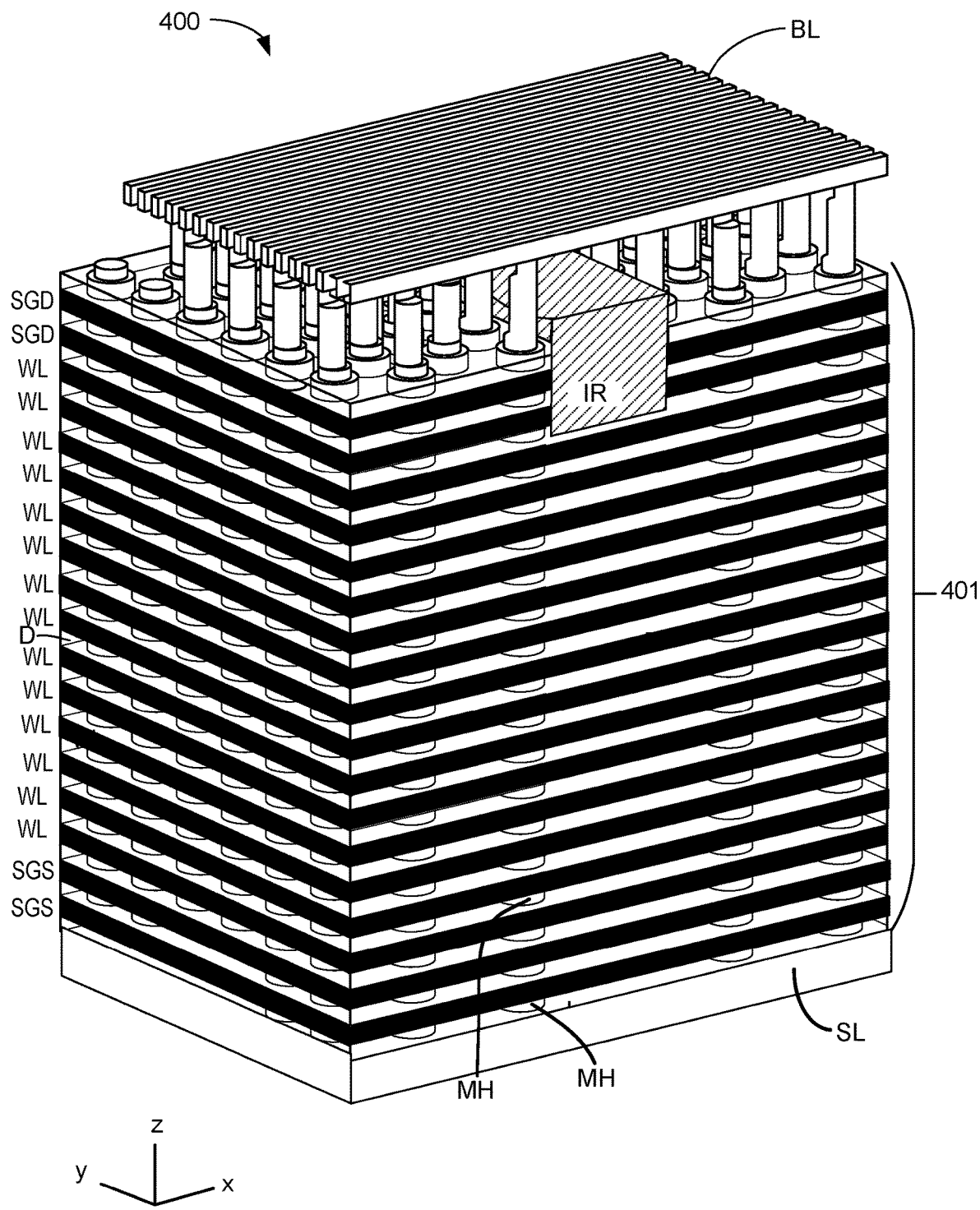
FIG. 5 is a perspective view of a portion of one example embodiment of a monolithic three dimensional memory structure.

FIG. 5 is a perspective view of a portion of one example embodiment of a monolithic three dimensional memory array/structure that can comprise memory structure 202, which includes a plurality non-volatile memory cells arranged as vertical NAND strings. For example, FIG. 5 shows a portion 400 of one block of memory. The structure depicted includes a set of bit lines BL positioned above a stack 401 of alternating dielectric layers and conductive layers. For example purposes, one of the dielectric layers is marked as D. The conductive layers are labeled as one of: SGD, WL, or SGS. An SGD conductive layer serves as drain side select lines. A WL conductive layer serves as a word line. An SGS conductive layer serves as a source side select line. The numbers of each of these conductive layers is limited for ease of illustration. The number of alternating dielectric layers and conductive layers can vary based on specific implementation requirements. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

In one embodiment the block is operated as a number of sub-blocks. In an embodiment, an isolation region (IR) divides the SGD layers into multiple SGD select lines, each of which is used to select a sub-block. FIG. 5 depicts an example having one IR region and thereby two sub-blocks. However, there may be more than one IR region and thereby more than two sub-blocks. Optionally, the IR region can extend down through all of the alternating dielectric layers and conductive layers.

Figure 5A:
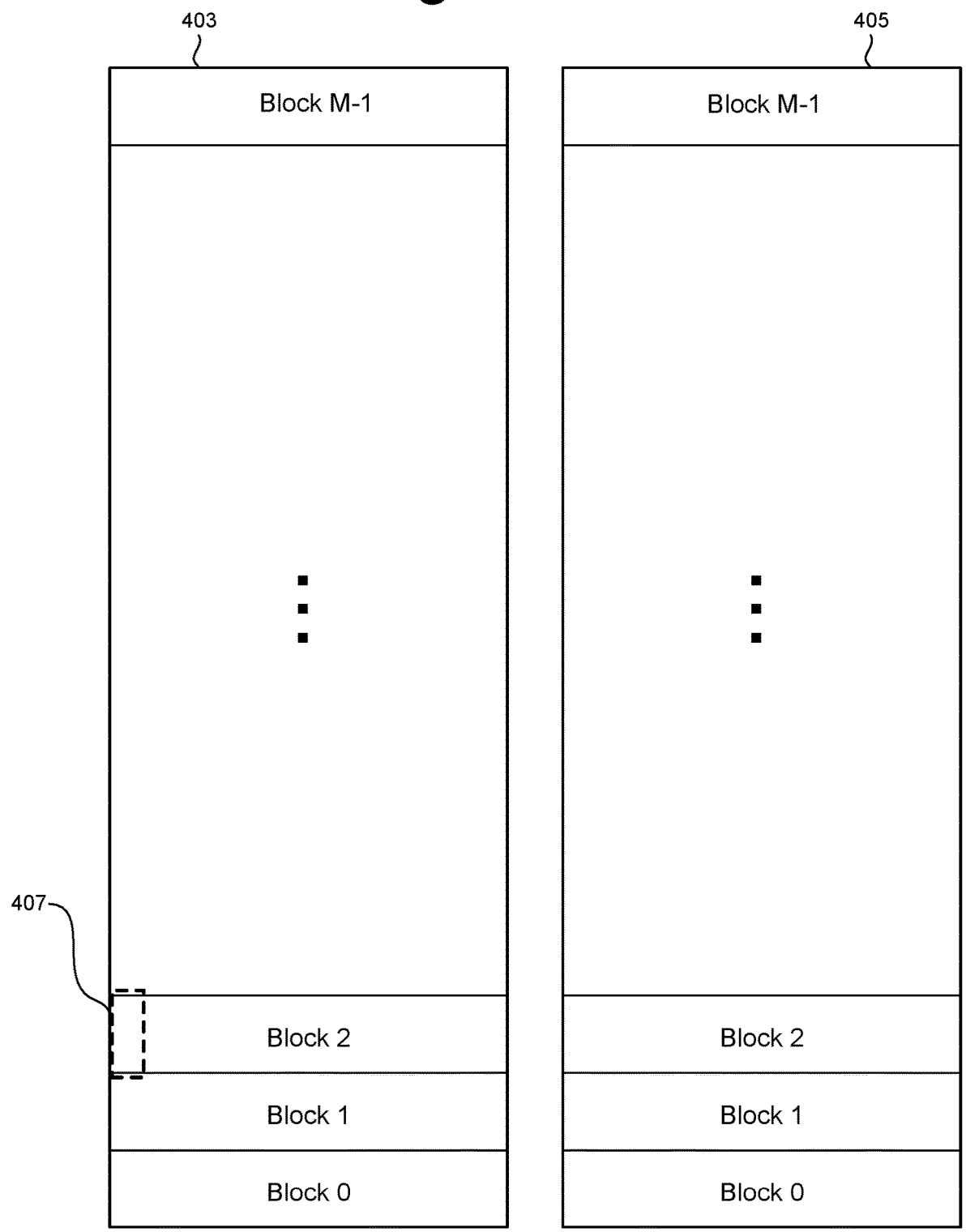
FIG. 5A is a block diagram of one embodiment of a memory structure having two planes.

FIG. 5A is a block diagram explaining one example organization of memory structure 202, which is divided into two planes 403 and 405. Each plane is then divided into M physical blocks. In one example, each plane has about 2000 physical blocks (or more briefly "blocks"). However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 5A shows two planes 403/405, more or fewer than two planes can be implemented. In some embodiments, memory structure 202 includes four planes. In some embodiments, memory structure 202 includes eight planes. In some embodiments, programming can be performed in parallel in a first selected block in plane 403 and a second selected block in plane 405.

Figure 5B:
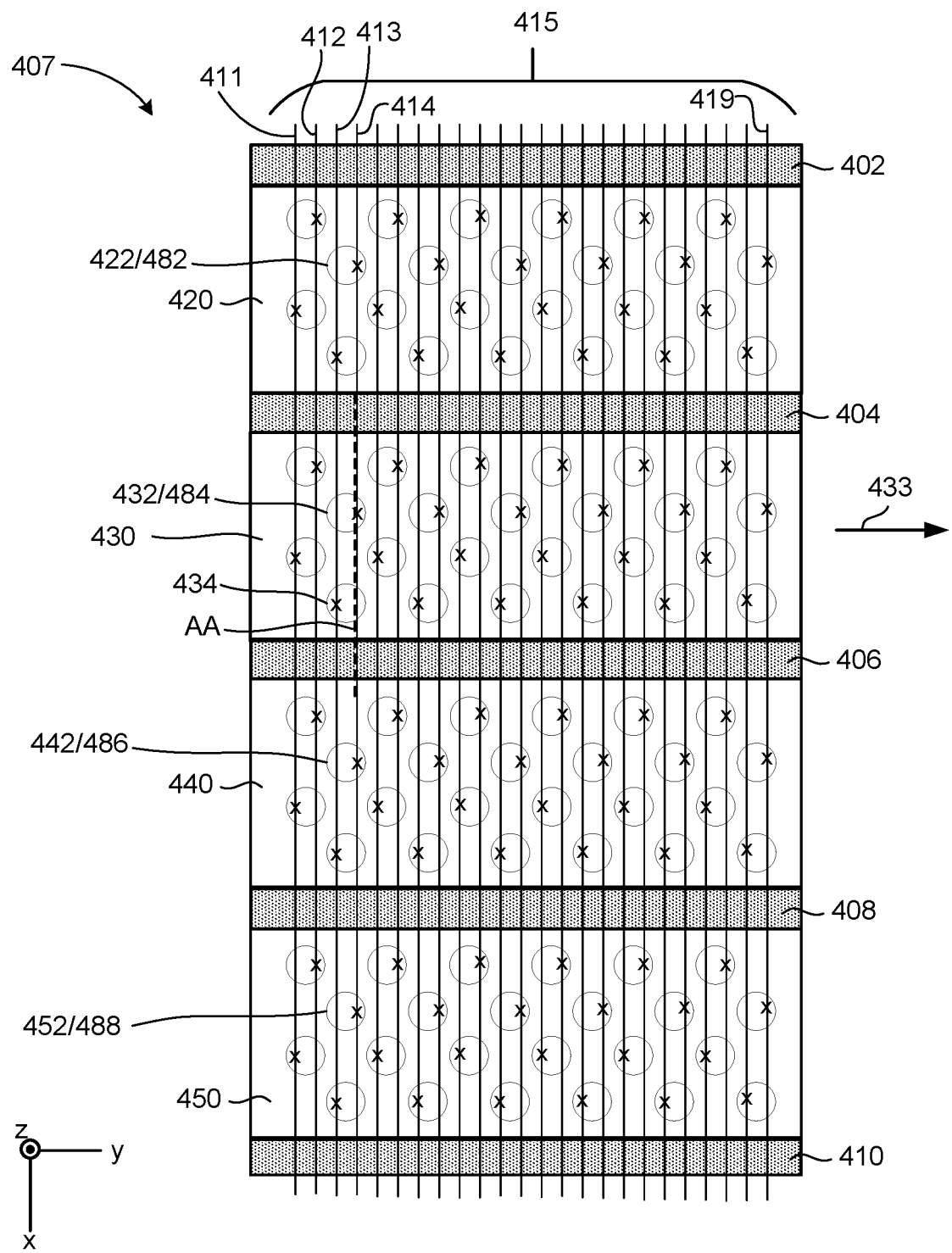
FIG. 5B is a block diagram depicting a top view of a portion of block of memory cells.

FIGS. 5B-5E depict an example three dimensional ("3D") NAND structure that corresponds to the structure of FIG. 5 and can be used to implement memory structure 202 of FIGS. 3A and 3B. FIG. 5B is a diagram depicting a top view of a portion 407 of Block 2. As can be seen from FIG. 5B, the physical block depicted in FIG. 5B extends in the direction of arrow 433. In one embodiment, the memory array has many layers; however, FIG. 5B only shows the top layer.

FIG. 5B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 5B depicts vertical columns 422, 432, 442, and 452. Vertical column 422 implements NAND string 482. Vertical column 432 implements NAND string 484. Vertical column 442 implements NAND string 486. Vertical column 452 implements NAND string 488. More details of the vertical columns are provided below. Since the physical block depicted in FIG. 5B extends in the direction of arrow 433, the physical block includes more vertical columns than depicted in FIG. 5B.

FIG. 5B also depicts a set of bit lines 415, including bit lines 411, 412, 413, 414, ... 419. FIG. 5B shows twenty-four bit lines because only a portion of the physical block is depicted. It is contemplated that more than twenty-four bit lines connected to vertical columns of the physical block. Each of the circles representing vertical columns has an "x" to indicate its connection to one bit line. For example, bit line 414 is connected to vertical columns 422, 432, 442 and 452.

The physical block depicted in FIG. 5B includes a set of isolation regions 402, 404, 406, 408, and 410, which are formed of SiO$_2$; however, other dielectric materials can also be used. Isolation regions 402, 404, 406, 408, and 410 serve to divide the top layers of the physical block into four regions; for example, the top layer depicted in FIG. 5B is divided into regions 420, 430, 440, and 450, which are referred to as sub-blocks. Each sub-block contains a large number of NAND strings. In one embodiment, isolation regions 402 and 410 separate the physical block 407 from adjacent physical blocks. Thus, isolation regions 402 and 410 may extend down to the substrate. In one embodiment, the isolation regions 404, 406, and 408 only divide the layers used to implement select gates so that NAND strings in different sub-blocks can be independently selected. Referring back to FIG. 5, the IR region may correspond to any of isolation regions 404, 406, or 408. In one example implementation, a bit line only connects to one vertical column/NAND string in each of regions (sub-blocks) 420, 430, 440, and 450. In that implementation, each physical block has sixteen rows of active columns and each bit line connects to four NAND strings in each block. In one embodiment, all of the four vertical columns/NAND strings connected to a common bit line are connected to the same word line (or set of word lines); therefore, the system uses the drain side selection lines to choose one (or another subset) of the four to be subjected to a memory operation (program, verify, read, and/or erase).

Although FIG. 5B shows each region (420, 430, 440, 450) having four rows of vertical columns, four regions (420, 430, 440, 450) and sixteen rows of vertical columns in a block, those exact numbers are an example implementation. Other embodiments may include more or fewer regions (420, 430, 440, 450) per block, more or fewer rows of vertical columns per region and more or fewer rows of vertical columns per block. FIG. 5B also shows the vertical columns being staggered. In other embodiments, different patterns of staggering can be used. In some embodiments, the vertical columns are not staggered.

Figure 5C:
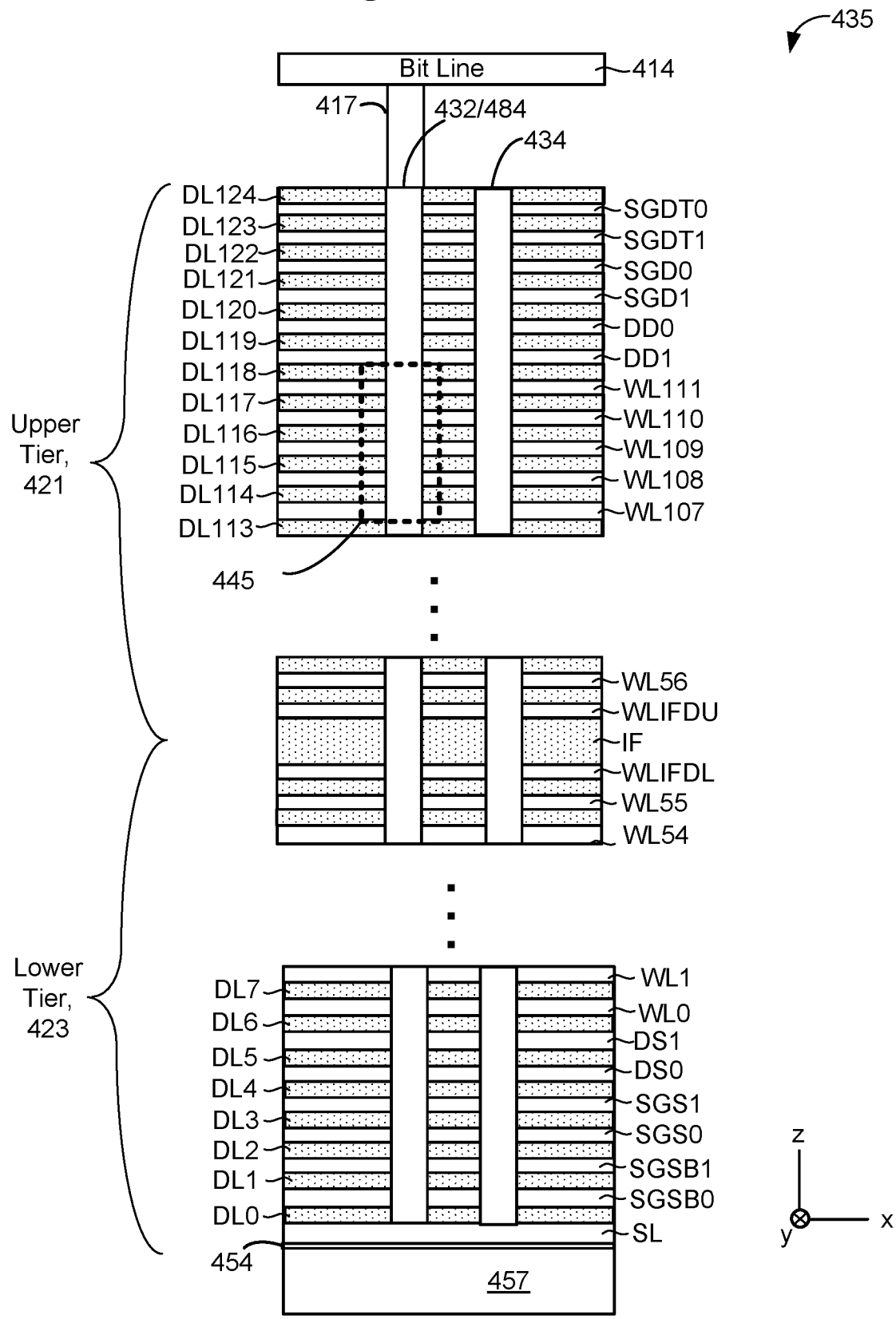
FIG. 5C depicts an embodiment of a stack showing a cross-sectional view along line AA of FIG. 5B.

FIG. 5C depicts an example of a stack 435 showing a cross-sectional view along line AA of FIG. 5B. The SGD layers include SGDT0, SGDT1, SGD0, and SGD1. The SGD layers may have more or fewer than four layers. The SGS layers includes SGSB0, SGSB1, SGS0, and SGS1. The SGS layers may have more or fewer than four layers. Six dummy word line layers DD0, DD1, WLIFDU, WLIDDL, DS1, and DS0 are provided, in addition to the data word line layers WL0-WL111. There may be more or fewer than 112 data word line layers and more or fewer than four dummy word line layers. Each NAND string has a drain side select gate at the SGD layers. Each NAND string has a source side select gate at the SGS layers. Also depicted are dielectric layers DL0-DL124.

Columns 432, 434 of memory cells are depicted in the multi-layer stack. The stack includes a substrate 457, an insulating film 454 on the substrate, and a portion of a source line SL. A portion of the bit line 414 is also depicted. Note that NAND string 484 is connected to the bit line 414. NAND string 484 has a source-end at a bottom of the stack and a drain-end at a top of the stack. The source-end is connected to the source line SL. A conductive via 417 connects the drain-end of NAND string 484 to the bit line 414.

In one embodiment, the memory cells are arranged in NAND strings. The word line layers WL0-WL111 connect to memory cells (also called data memory cells). Dummy word line layers DD0, DD1, DS0 and DS1 connect to dummy memory cells. A dummy memory cell does not store and is not eligible to store host data (data provided from the host, such as data from a user of the host), while a data memory cell is eligible to store host data. In some embodiments, data memory cells and dummy memory cells may have the same structure. Drain side select layers SGD are used to electrically connect and disconnect (or cut off) the channels of respective NAND strings from bit lines. Source side select layers SGS are used to electrically connect and disconnect (or cut off) the channels of respective NAND strings from the source line SL.

FIG. 5C depicts an example of a stack 435 having two tiers. The two-tier stack comprises an upper tier 421 and a lower tier 423. A two-tier or other multi-tier stack can be used to form a relatively tall stack while maintaining a relatively narrow memory hole width (or diameter). After the layers of the lower tier are formed, memory hole portions are formed in the lower tier. Subsequently, after the layers of the upper tier are formed, memory hole portions are formed in the upper tier, aligned with the memory hole portions in the lower tier to form continuous memory holes from the bottom to the top of the stack. The resulting memory hole is narrower than would be the case if the hole were etched from the top to the bottom of the stack rather than in each tier individually. An interface (IF) region is created where the two tiers are connected. The IF region is typically thicker than the other dielectric layers. Due to the presence of the IF region, the adjacent word line layers suffer from edge effects such as difficulty in programming or erasing. These adjacent word line layers can therefore be set as dummy word lines (WLIFDL, WLIFDU). In some embodiments, the upper tier 421 and the lower tier 423 are erased independent of one another. Hence, data may be maintained in the lower tier 423 after the upper tier 421 is erased. Likewise, data may be maintained in the upper tier 421 after the lower tier 423 is erased.

Figure 5D:
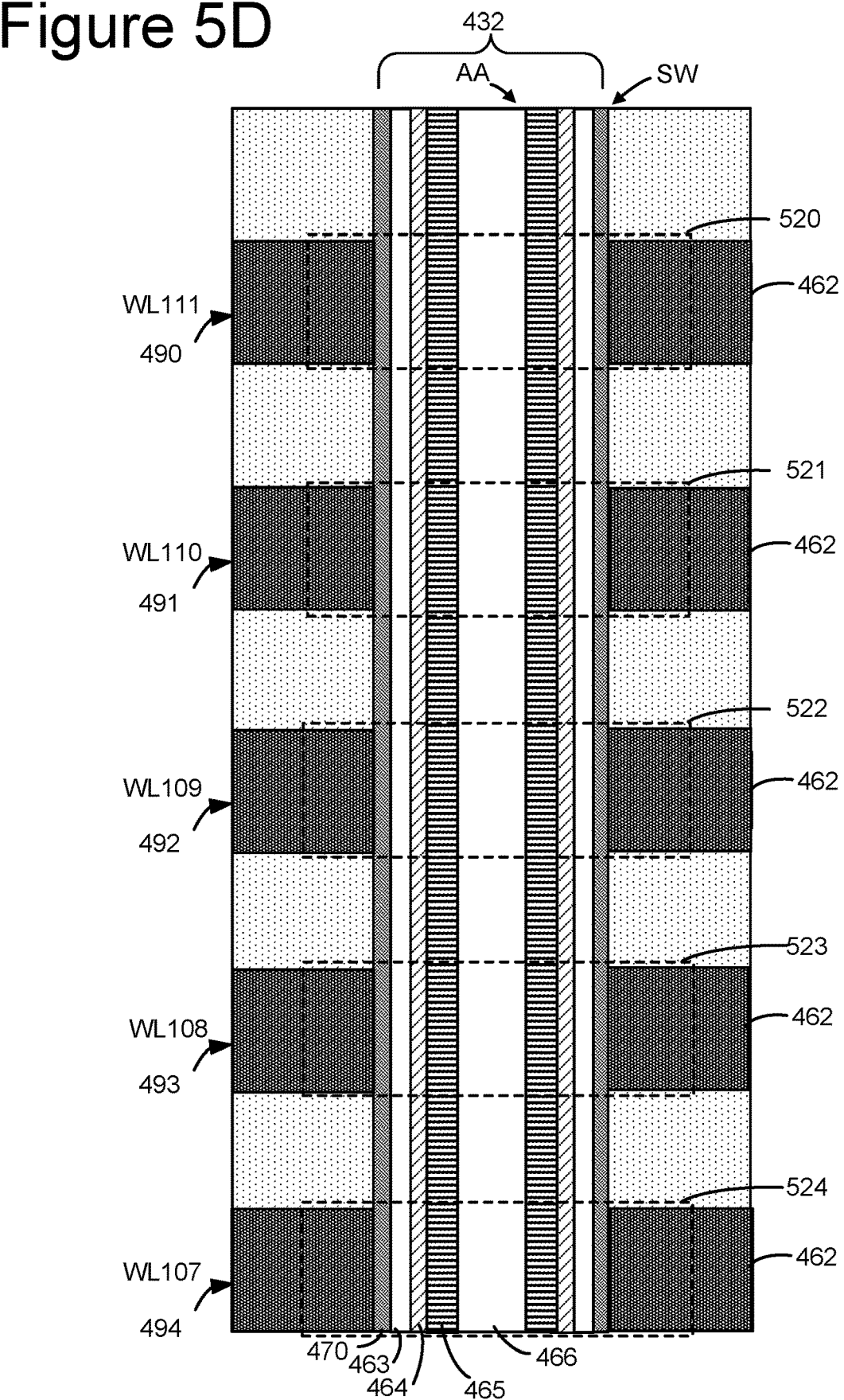
FIG. 5D depicts a view of the region 445 of FIG. 5C.

FIG. 5D depicts a view of the region 445 of FIG. 5C. Data memory cell transistors 520, 521, 522, 523, and 524 are indicated by the dashed lines. A number of layers can be deposited along the sidewall (SW) of the memory hole 432 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Each of the memory holes can be filled with a plurality of annular layers (also referred to as memory film layers) comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 5E:
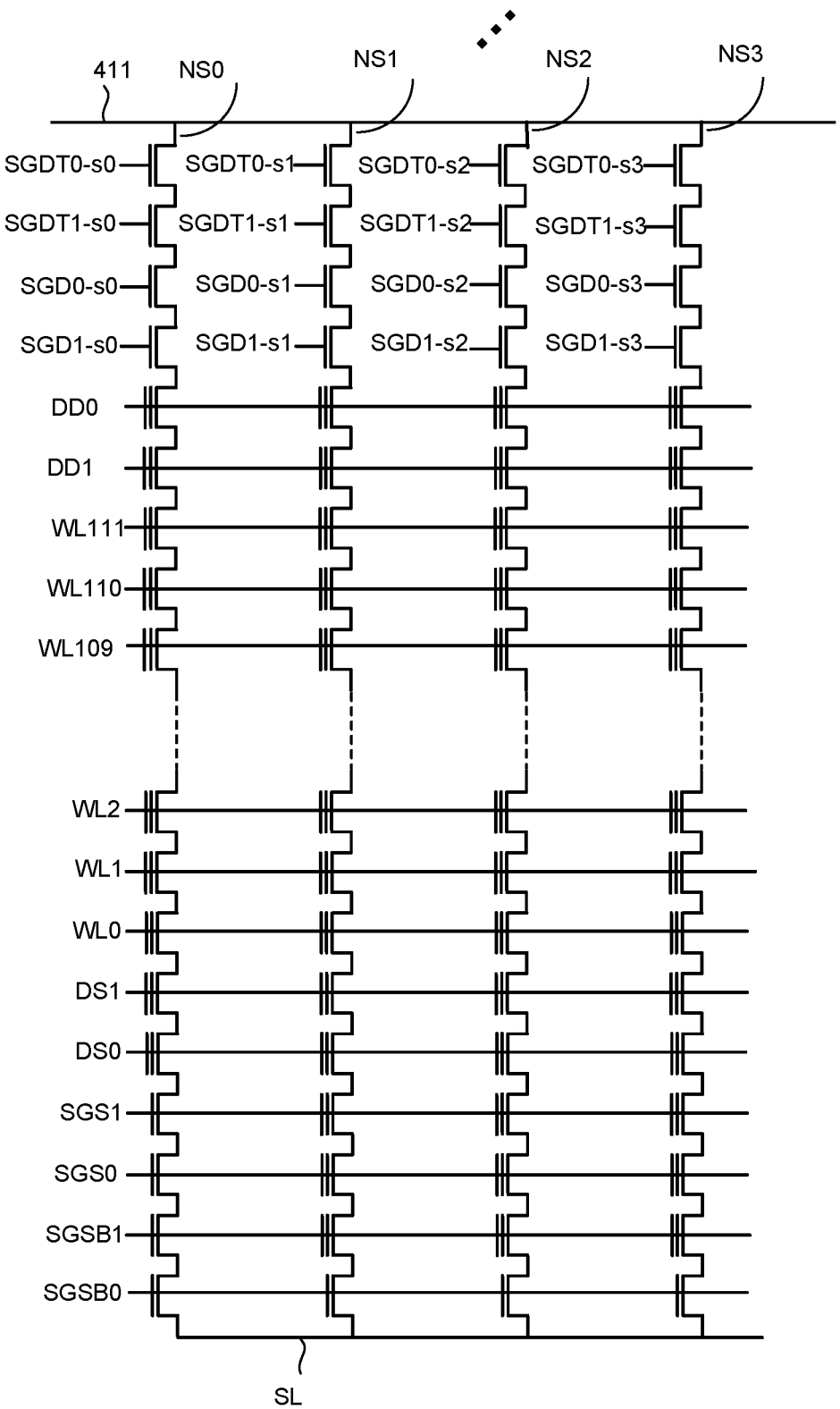
FIG. 5E is a schematic diagram of a portion of one embodiment of a block, depicting several NAND strings.

FIG. 5E is a schematic diagram of a portion of the memory array 202. FIG. 5E shows physical data word lines WL0-WL111 running across the entire block. The structure of FIG. 5E corresponds to a portion 407 in Block 2 of FIG. 5A, including bit line 411. Within the physical block, in one embodiment, each bit line is connected to four NAND strings. Thus, FIG. 5E shows bit line 411 connected to NAND string NS0, NAND string NS1, NAND string NS2, and NAND string NS3.

In one embodiment, there are four sets of drain side select lines in the physical block. For example, the set of drain side select lines connected to NS0 include SGDT0-$s0$, SGDT1-$s0$, SGD0-$s0$, and SGD1-$s0$. The set of drain side select lines connected to NS1 include SGDT0-$s1$, SGDT1-$s1$, SGD0-$s1$, and SGD1-$s1$. The set of drain side select lines connected to NS2 include SGDT0-$s2$, SGDT1-$s2$, SGD0-$s2$, and SGD1-$s2$. The set of drain side select lines connected to NS3 include SGDT0-$s3$, SGDT1-$s3$, SGD0-$s3$, and SGD1-$s3$. Herein the term "SGD" may be used as a general term to refer to any one or more of the lines in a set of drain side select lines. In some embodiments, the same operating voltage is applied to SGDT0 and SGDT1. In some embodiments, the same operating voltage is applied to SGD0 and SGD1. In some erase embodiments, different operating voltage are applied to SGDT0/SGDT1 than to SGD0/SGD1. Note that SGDT0/SGDT1 are adjacent to the bit line. In some erase embodiments, a voltage applied to SGDT0/SGDT1 in combination with a bit line voltage may be used to generate a gate induced gate leakage (GIDL) current. Such a voltage applied to SGDT0/SGDT1 may be referred to herein as a GIDL voltage.

In an embodiment, each line in a given set may be operated independent from the other lines in that set to allow for different voltages to the gates of the four drain side select transistors on the NAND string. Moreover, each set of drain side select lines can be selected independent of the other sets. Each set drain side select lines connects to a group of NAND strings in the block. Only one NAND string of each group is depicted in FIG. 5E. These four sets of drain side select lines correspond to four sub-blocks. A first sub-block corresponds to those vertical NAND strings controlled by SGDT0-$s0$, SGDT1-$s0$, SGD0-$s0$, and SGD1-$s0$. A second sub-block corresponds to those vertical NAND strings controlled by SGDT0-$s1$, SGDT1-$s1$, SGD0-$s1$, and SGD1-$s1$. A third sub-block corresponds to those vertical NAND strings controlled by SGDT0-$s2$, SGDT1-$s2$, SGD0-$s2$, and SGD1-$s2$. A fourth sub-block corresponds to those vertical NAND strings controlled by SGDT0-$s3$, SGDT1-$s3$, SGD0-$s3$, and SGD1-$s3$. As noted, FIG. 5E only shows the NAND strings connected to bit line 411. However, a full schematic of the block would show every bit line and four vertical NAND strings connected to each bit line.

In one embodiment, all of the memory cells on the NAND strings in a physical block are erased as a unit. However in some embodiments, a physical block is operated as an upper tier and a lower tier, wherein the upper tier and the lower tier each form an erase unit. For example, memory cells connected to WL0-WL55 may be in the lower tier 423 and memory cells connected to WL56-WL111 may be in the upper tier 421. Hence, memory cells connected to WL0-WL55 may be in one erase unit and memory cells connected to WL56-WL111 may be in another erase unit. A physical block could be operated in more than two tiers. Erase units can be formed based on other divisions of physical blocks.

Although the example memories of FIGS. 5-5E are three dimensional memory structure that includes vertical NAND strings with charge-trapping material, other 3D memory structures can also be used with the technology described herein.

The storage systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate.

Figure 1A:
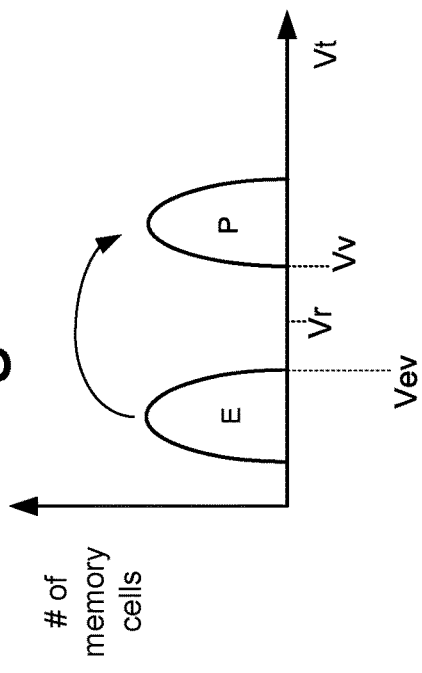
FIGS. 1A and 1B depicts threshold voltage distributions.
Figure 1B:
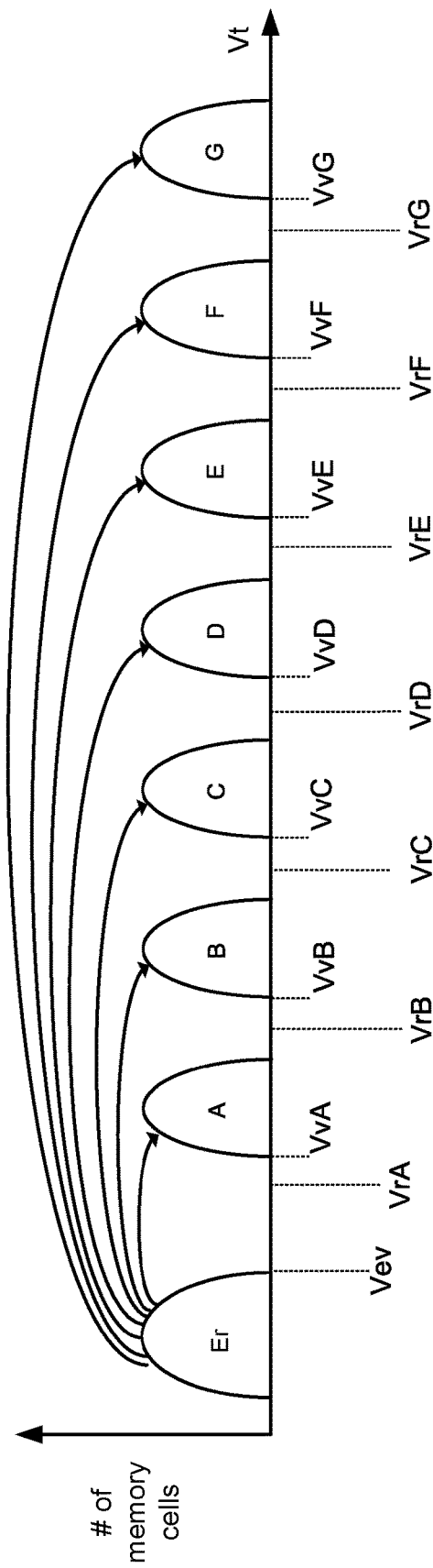

FIG. 6 is a flowchart of one embodiment of a process 600 of operating a memory system using zoned read parameters. Process 600 involves reading different sets of memory cells using zoned read parameters. In an embodiment, each set of memory cells are connected to the same word line. In an embodiment the memory cells are NAND memory cells in a three-dimensional memory structure. Step 602 includes determining a target read level for each set of memory cells in some region of the memory system. In an embodiment, the region is a block. In an embodiment each set of memory cells are connected to the same word line in a selected block and the region is the selected block. Note that step 602 can be performed on a sample of blocks, with the results being averaged. The target read level is a read level that should produce good read results such as a low error rate, fast decoding, etc. In an embodiment, an optimal read level is selected as the target read level. In one embodiment, a bit error rate estimation scan (BES) is used to determine the target read level. Briefly, the BES may include sensing memory cells using different sets of read levels and then determining an error metric such as a BER for each set of read levels. Further details of using a BES to determine a target read level are described in U.S. Pat. No. 10,991,444, "Tiered Read Reference Calibration," which is hereby incorporated by reference. However, step 602 may use a technique other than a BES scan to determine the target read level. In one embodiment, a target read level is determined for each word line in a block. In an embodiment, multiple blocks are tested to arrive at a target read levels that apply to all blocks under test (and perhaps other blocks). Also note that for ease of discussion, process 600 refers to a read level. The process 600 may be used for SLC or MLC. Thus, process 600 may be used for multiple read levels. For example, with respective an MLC example such as in FIG. 1B, the process 600 may be used for any one or more read levels VrA, VrB, VrC, VrD, VrE, VrF, and/or VrG. However, process 600 is not limited to a three-bit per cell MLC.

Step 604 includes ranking the sets of memory cells in the region in order based on the target read levels. In an embodiment, the word lines in a block are ranked using the target read level of each word line. For example, the sets of cells may be ranked using a low to high ordering of read voltages. However, the ordering need not use the target read voltage itself, but could use an offset to a base voltage. This offset may be added to the base voltage to arrive at the target read voltage that may be used to read the cell. Thus, ranking based on target read levels may also be achieved by ranking using voltage offsets to some base reference voltage. Thus, the phrase "ranking based on the target read level" or the like is intended to cover a ranking that directly uses the target read levels and also cover using some parameter through which the target read level can be determined such as an offset to a base voltage. In one embodiment, delta read levels are ranked. The delta read level for a particular set of memory cells may be defined as the difference between a default read level and the target read level for a particular set of memory cells. In an embodiment, a delta read voltage for a particular word line is defined as the difference between a default read voltage and the target read voltage for the particular word line. In one embodiment, one of the sets of memory cells is selected as representative, with the target read level for that representative set being defined as the representative read level. Furthermore, a read level offset for a particular set of memory cells may be defined as the difference between the target read level of the representative set of memory cells minus the target read level of the particular set of memory cells. The sets of memory cells may then be ranked in order based on the read level offsets.

Step 606 includes assigning each set of memory cells in the region to a zone based on the ranking. In an embodiment, each word line in a block is assigned to a zone. Note that this same assignment may be applied to many different blocks. For example, in each block on the memory die may use the same assignment of word lines to zones. For example, WL1 in each block may be assigned to the same zone, WL2 in each block may be assigned to the same zone, etc. However, it is not required that all blocks on the memory die use the same assignment of word lines to zones. In an embodiment, each set of memory cells (the set may be, but is not required to be, cells connected to the same word line) is assigned to a zone based on the ranking. Step 606 may include forming zones the have substantially equal size ranges in target read levels, wherein each zone covers a different range of target read levels. Step 606 may include forming at least one zone that contains a physically non-contiguous set of word lines. Step 606 may include forming zones to minimize a voltage gap in read levels in each zone given the number of zones. Minimizing the voltage gap within a zone results in the sets of memory cells in the zone being read at close to optimal read levels. In an embodiment, the zoned read parameters (see 233, FIG. 3A or 3B) are updated by, for example, updating a table of read level offsets based on results of step 606.

Step 608 includes reading each set of cells in the region using a representative read level for the zone to which the set of cells was assigned. In an embodiment, each word line in a block is read based on a representative read level for the zone to which the word line was assigned Note that step 608 may be applied to many different blocks for which the assignment in step 606 was made. Note that the representative read level for the zone will be close to the optimal read level for the memory cells assigned to the zone. In an embodiment, the table in the zoned read parameters 233 that was updated in step 606 is accessed in step 608 by the system control logic 260 to obtain the latest read levels.

FIG. 7 is a flowchart of one embodiment of a process 700 of assigning memory cells into substantially equal sized zones. Note that a representative read level will be used for each zone (see, for example, step 608 in process 600). The process may be used in step 606 of process 600. Step 702 includes forming zones having substantially equal size ranges in target read levels. Each zone covers a different range of target read levels. For example, each zone may have about a 0.3V range in read reference voltage. The actual voltage that is used to read the cells will be selected from within this range. As one example, the midpoint of the range may be used as the actual read voltage. Step 702 may include dividing a voltage range between a largest target read voltage and a smallest target read voltage into substantially equal sized zones. Each zone covers a different voltage range of target read voltage. In other words, each zone covers a unique range of contiguous target read voltages. Note that step 702 may be implemented by expressing the target read level as a read voltage offset that is applied to a base read reference voltage. Therefore, step 702 may be implemented by forming zones having substantially equal size ranges in read voltage offsets. For example, each zone may have about a 0.3V range in read voltage offsets. The actual read voltage offset that is used (after applying to a base voltage) to read the cells will be selected from within this range. As one example, the midpoint of the range may be used as the representative read voltage offset for the zone. Step 704 includes assigning each particular set of memory cells into one of the zones based on the target read level (or target read voltage offset) for the particular set of memory cells. In an embodiment, the zoned read parameters (see 233, FIG. 3A or 3B) are updated by, for example, updating a table of read level offsets based on results of step 704.

FIG. 8 is a flowchart of one embodiment of a process 800 of operating a memory system using zoned read parameters. Process 800 provides further details for an embodiment of steps 602-606 in process 600. For ease of discussion an example will be provided in which memory cells connected to the same word line are tested for optimal read levels. There may be many word lines in each block. As an example, there may be over 100 or even over 200 word lines in a block.

Step 802 includes determining optimal read levels for each word line in a set of sample blocks in the memory system. The sample blocks are representative of some larger group of blocks for which the word lines will be placed into zones. In an embodiment, the set of sample blocks includes one or more blocks on the same memory die. In an embodiment, the set of sample blocks are selected as being representative for the memory die. In this example, the word lines for all of the blocks on the memory die may be assigned to zones based on the analysis of the sample blocks. However, set of sample blocks may be selected as being representative for some other unit such as a plane, portion of plane, etc. In such examples, the word lines for all of the blocks in a plane (or portion of a plane) may be assigned to zones based on the analysis of the sample blocks. Step 802 determines, for each word line, an optimal read reference voltage for one or more read levels. The word lines may be defined by word line numbers, which are based on the physical location of the word line in the block. For example, in the example in FIG. 5C there are 112 word lines in a block (WL0, WL1, . . . . WL111). Each block may have a similar structure such that WL0 is always in the same relative physical location in its block. Note that there could be more or fewer than 112 word lines in a block. However, in general the number of word lines in a block increases with newer generations of memory, which therefore adds to the challenges of providing read parameters for the word lines. As one example, with respect to an SLC example in FIG. 1A, an optimal read voltage may be determined for Vr. With respect to an MLC example in FIG. 1B, optimal read voltages may be determined for VrA, VrB, VrC, VrD, VrE, VrF, and/or VrG. A variety of techniques can be used to determine the optimal read levels for each word line. In one embodiment, a bit error rate estimation scan (BES) is used to determine the optimal read reference voltages. However, step 802 may use a technique other than a BES scan to determine the optimal read reference voltages.

Step 804 includes calculating, for each WL in the set of sample blocks in the memory system, a delta read level between the optimal read reference voltage and a default read reference voltage. The delta may be calculated as the default read reference voltage minus the optimal read reference voltage. Step 804 may calculate a separate delta for each word line in each sample block that is tested. Thus, for example, if n blocks are tested then there will be n deltas for each WL. For example, WL4 in each block that is tested will have its own delta. Step 804 may further calculate a standard deviation for each WL. The standard deviation, as is well understood, is a measure of variance. A word line having a low standard deviation will thus have a low variance in the deltas between the blocks. For example, WL4 in the set of blocks that is tested may have a low variance in the deltas.

Figure 9:
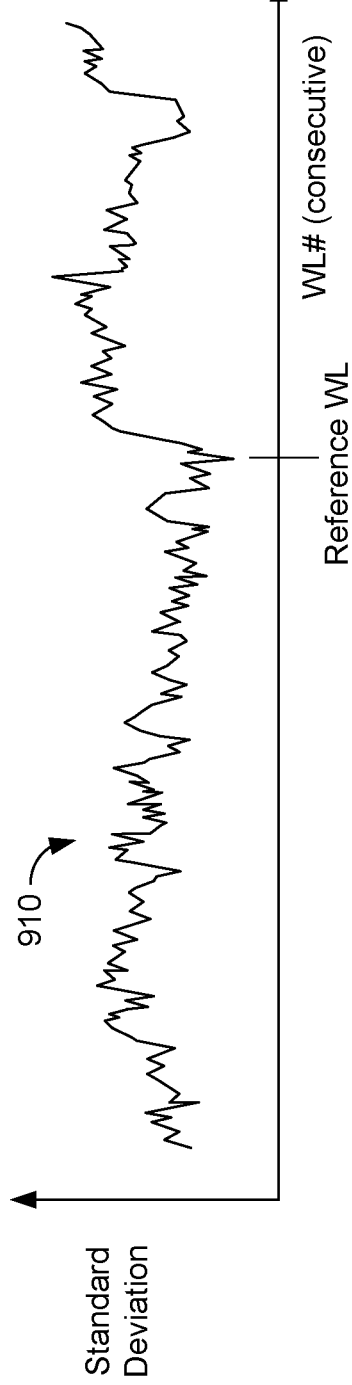
FIG. 9 depicts a plot of hypothetical standard deviations in the read level offsets for the word lines.

Step 806 includes determining a reference word line. As one example, the word line having the lowest standard deviation is selected as the reference word line. Thus, the same word line (e.g., same WL number) may serve as the reference word line for each of the blocks. FIG. 9 depicts a plot 910 of hypothetical standard deviations in the read level offsets for the word lines. The x-axis is the word line number and the y-axis is the standard deviation. The word line having the lowest standard deviation may be selected for use as the reference word line. Note that in FIG. 9 the word line numbers are ordered consecutively on the x-axis.

Step 808 includes ranking the optimal read level offsets for each word line in a block. Note that step 808 uses the analysis of the sample blocks. Step 808 may include, for each particular word line, calculating a read level offset between the default read level and the optimum read level for the particular word line. As one example, this is the optimal read voltage for the reference word line minus the optimal read voltage for the particular word line. Therefore, a read level offset may be determined for each word line (noting that the reference word line may have an offset of 0). The read level offsets are then ranked from low to high.

Figure 10:
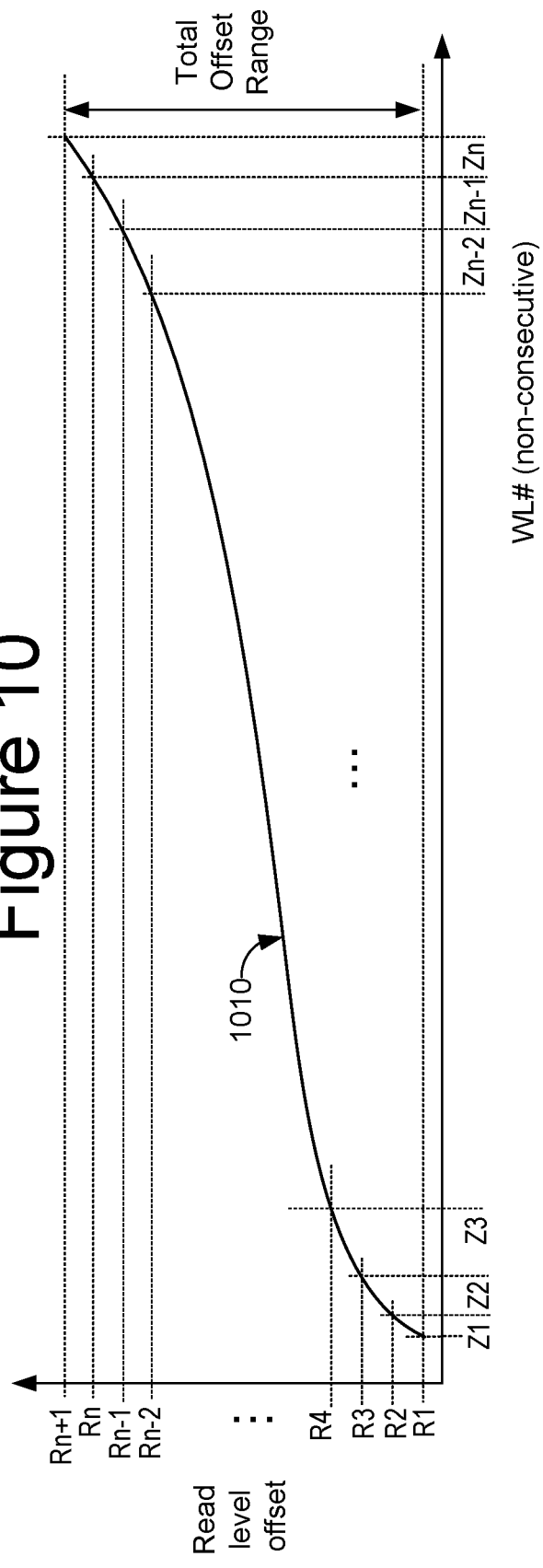
FIG. 10 depicts a plot that shows an example ranking of word lines by read level offsets.

Step 810 includes assigning each word line to a zone based on the ranking. Step 810 pertains to not only the sample blocks but the larger group of blocks represented by the sample blocks. For example step 810 may pertain to all of the blocks on the memory die, all blocks in a plane, etc. For purpose of explanation, WL0 to WL111 (see FIG. 5C) may be ranked. FIG. 10 depicts a plot 1010 that shows an example ranking of word lines by read level offsets. The x-axis is the word line number and the y-axis is the read level offset. Note that in FIG. 10 the word line numbers are not ordered consecutively on the x-axis. Instead the word line numbers are ordered based on the read level offsets. Each zone covers a unique range of offsets. Note that in FIG. 10 the voltage gaps on the x-axis may be substantially the same for each zone. Moreover, the voltage gap for each zone is relatively small. A representative read voltage offset may be selected for each zone. For example, the representative read voltage offset for a zone could be mid-way between the lowest read voltage offset and the highest read voltage offset for that zone. Therefore, the word lines may be read at close to their optimal read voltages. In an embodiment, the zoned read parameters (see 233, FIG. 3A or 3B) are updated by, for example, updating a table of read level offsets based on results of step 810.

Figure 11:
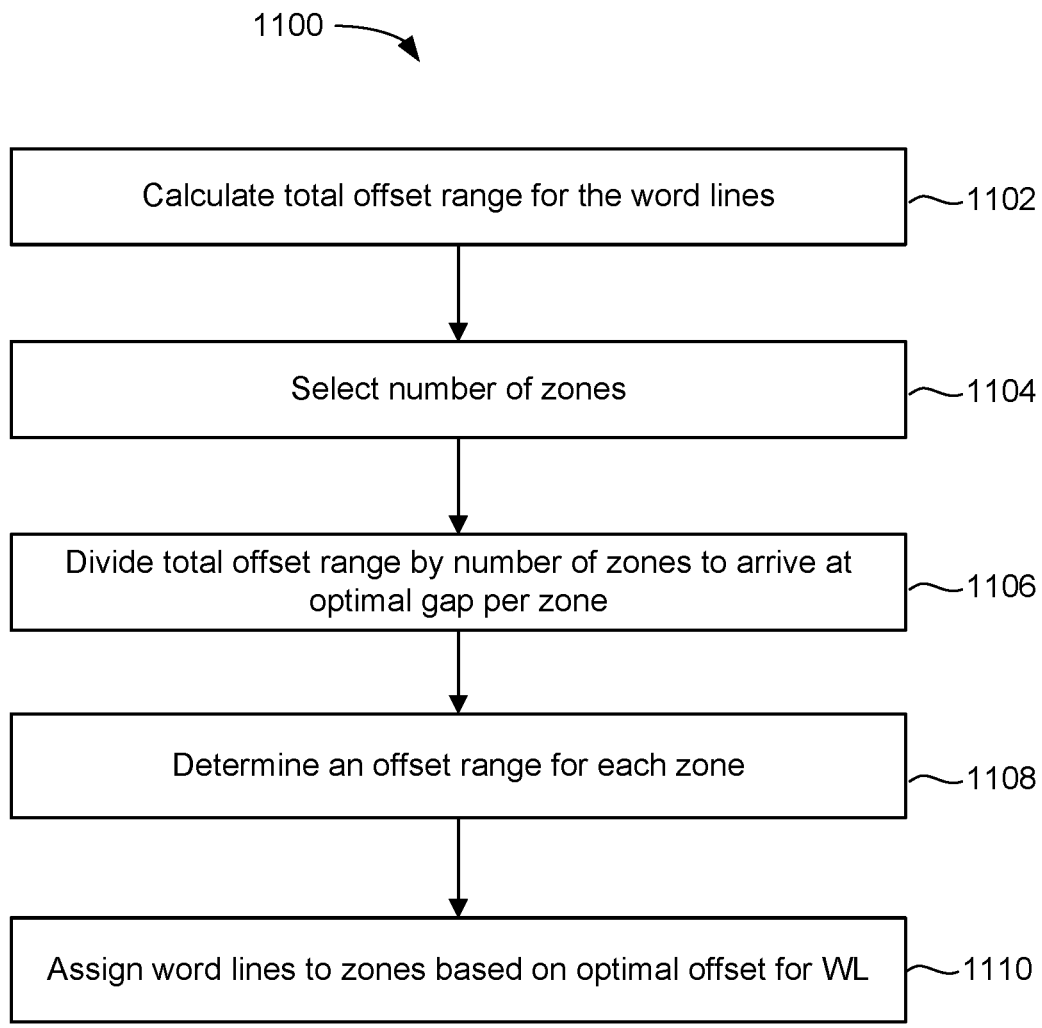
FIG. 11 is a flowchart of one embodiment of a process of forming read parameter zones.

FIG. 11 is a flowchart of one embodiment of a process 1100 of forming read parameter zones. Process 1100 provides further details for an embodiment of step 810. Reference will be made to FIG. 10 to facilitate discussion. Step 1102 includes calculating a total offset range for the word lines. In FIG. 10, the total offset range is between R1 to Rn+1, wherein R is a smallest read voltage offset and Rn+1 is a largest read voltage offset. Step 1104 includes selecting a number of zones. In FIG. 10, there are "n" zones (Z1, Z2, Z3, . . . . Zn-2, Zn-1, Zn). Step 1106 includes dividing the offset range by the number of zones to arrive at an optimal voltage gap per zone. In an embodiment, each zone has approximately the same voltage gap (e.g., approximately equal voltage gaps). Step 1108 includes determining an offset range for each zone. With reference to FIG. 10, the offsets (R1, R2, R3, R4, . . . . Rn-2, Rn-1, Rn, Rn+1) are approximately equidistant to each other. Zone 1 will have an offset range between R1 and R2; Zone 2 will have an offset range between R2 and R3, etc. As one example, the following formula can be used for zones 1 to 3, with a similar formula for higher numbered zones.

$$R1 \le Z1 < R2 \le Z2 < R3 \le Z3 < R4 \qquad \text{Eq. 1}$$

Step 1110 includes assigned word lines to zones. Word lines having an offset greater than or equal to R1 but less than R2 may be assigned zone 1, word lines having an offset greater than or equal to R2 but less than R3 may be assigned into zone 3, word lines having an offset greater than or equal to R3 but less than R4 may be assigned into zone 3, etc. Dashed horizontal lines in FIG. 10 depict intersections between the read offsets and the plot 1010 of the ranking of the word line offsets. Dashed vertical lines in FIG. 10 are located where the dashed horizontal lines intersect the plot 1010. The intersections of the vertical lines with the plot may be used to determine which word lines are assigned into each zone. In one embodiment, the assignment of the zones is performed automatically by one or more control circuits.

FIG. 12A a table that shows how assigning read parameters based on physical location of word lines can result in large voltage gaps in the zones. The table contains an example in which word lines are placed into zones in accordance with a physical location of the word lines in the block ("physical zoning"). As an example, there may be over two hundred word lines in the block. About 20 zones may be used for each example. The table shows example word lines for zones 4, 5, 6, and 7 for each case. Column 1202 contains the zone number. For brevity not all zones are shown in the table. Column 1204 contains the word lines that are in each zone for the example of physical zoning. For example, physical zoning may place WL22-WL41 into Zone 4, WL42-WL66 into Zone 5, etc. Referring back to FIG. 2, there can be considerable variation in optimal read levels for word lines that are physically contiguous, which can result in a large voltage gap as indicated by double-sided arrow 20. Column 1206 contains an example read level gap for physical zoning (PZ). For example, physical zoning may result in a read level gap of 2.4V for Zone 4, 2V for Zone 5, of 2.9V for Zone 6, and of 3.1V for Zone 7. Both the examples of what word lines are placed into the physical zones and the read level gaps are for purpose of illustration. The read level gaps will be implementation dependent. However, note that for physical zoning the word lines in a zone are physically contiguous. Placing word lines into zones based on physical location may simplify the algorithm, but may result in relatively large read offset gaps in the zone. Recall that the read level offset is the difference between the highest read level offset and the lowest read level offset in the zone. Moreover, recall that when reading any word line in the zone a representative offset is typically used. Therefore, zones with a large read level offset may fail to provide an optimum read level for some of the word lines.

FIG. 12B is an embodiment of a table of zoned read parameters. The zoned read parameters can improve read quality. The table contains an example of zoned read parameters in which word lines are placed into zones in accordance with a ranking of read level offsets ("offset ranking zoning"). The table also has a column 1212 for the zone #similar to the table in FIG. 12A. However, the table in FIG. 12B shows in column 1208 some of the word lines that might be placed into zones 4-7 for a read offset ranked embodiment. The word lines placed into each zone are for purpose of illustration and will be implementation dependent. However note that the set of word lines in a zone are not physically contiguous. Instead the word lines in a zone in column 1208 are close to each other in read level offsets. Therefore, the read level gap is small for a read offset ranked embodiment.

Column 1210 contains example read level gaps for a read offset ranked zone (RZ) embodiment. In this example, the read level gaps are about the same for each zone. However, it is not a requirement that all zones have about the same read level gap. For example, a few zones could have a read level gap that is significantly different from 0.3. Recall that each word line in a particular zone may be read with the same read reference voltage. In other words, a representative read voltage offset may be chosen for the particular zone (and added to a base reference voltage). However, the small read voltage offset gaps mean that each word line in the particular zone is read with close to optimum read reference voltages. Column 1220 contains a representative read voltage offset for the zone. The representative read voltage offset is different for each zone. The representative read voltage offset for a particular zone will be close to the read voltage offset of the word lines in that particular zone. Therefore, each word line will be read with a voltage that is close to a target or optimum voltage for that particular word line.

Figure 13:
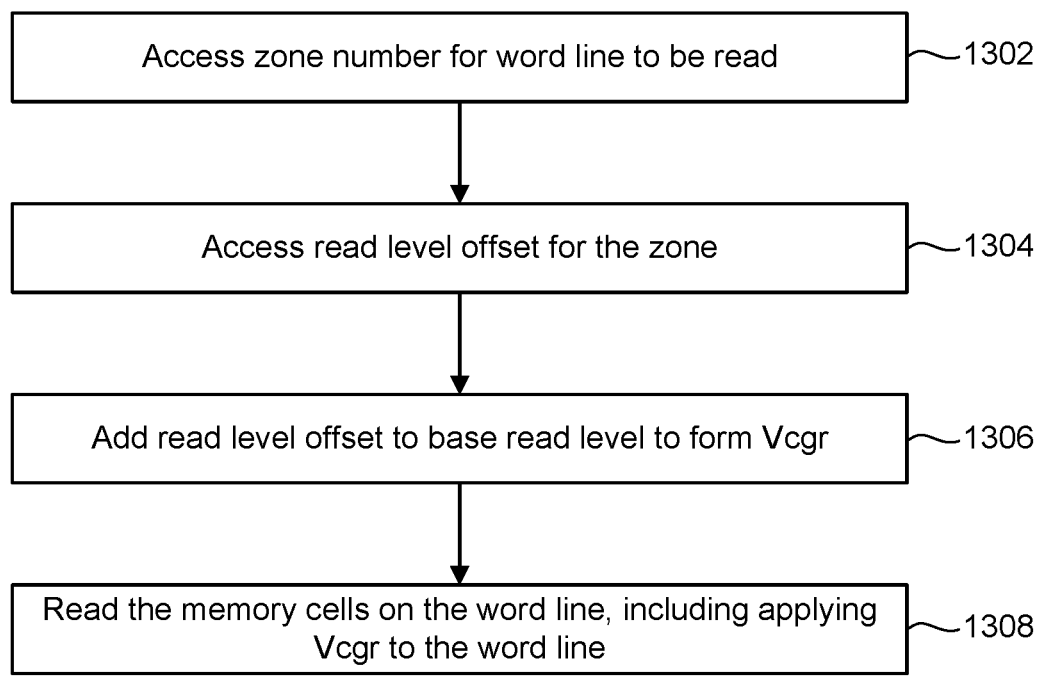
FIG. 13 is a flowchart of an embodiment of a process of reading memory cells using zoned read parameters.

FIG. 13 is a flowchart of an embodiment of a process 1300 of reading memory cells using zoned read parameters. Step 1302 includes accessing a zone number for the word line to be read. In an embodiment the memory system stores a table that lists the word lines in each zone. This table may be similar to the table in FIG. 12B but does not need to specify the read level gap (column 1210). The table could be stored in the zoned read parameters (see 233, FIG. 3A or 3B). The table may be updated from time to time by performing process 600, 700, 800, and/or 1100. Step 1304 includes accessing a read level offset for the zone. Step 1304 may include reading the zoned read parameters (see 233, FIG. 3A or 3B), which may have been updated by, but not limited to, performing any of process 600, 700, and/or 800.

Step 1306 includes adding the read level offset to a base read level to form a read reference voltage (Vcgr). In one embodiment, the base read level is an optimal read level for a reference word line. However, the base read level could be some other default read level that is not necessarily assigned to a reference word line. Step 1308 includes reading the memory cells connected to the word line. Step 1308 include es applying the read reference voltage (Vcgr) to the word line (and thereby the control gates of the memory cells).

In view of the foregoing, an embodiment includes an apparatus comprising one or more control circuits configured to connect to a memory structure having a plurality of physically contiguous regions. Each region has a plurality of sets of memory cells. The one or more control circuits are configured to assign each particular set of memory cells in a region to a zone of a plurality of zones based on a ranking of a target read level for each particular set of memory cells in the region. The one or more control circuits are configured to read each particular set of memory cells in the region using a representative read level for the zone into which the particular set of memory cells is assigned.

In a further embodiment, the one or more control circuits is further configured to form the zones to have substantially equal size ranges in target read levels. Each zone of the plurality of zones covers a different range of target read levels. The one or more control circuits is further configured to assign each particular set of memory cells in the region into one of the zones based on the target read level of the particular set of memory cells.

In a further embodiment, the memory structure comprises a plurality of blocks of memory cells. Each block comprises one of the plurality of physically contiguous regions. Each block has a plurality of word lines. Each particular set of memory cells in a particular block is connected to a different word line in the particular block. The ranking of the target read level for each set of memory cells in the region comprises a ranking of target read levels for the word lines in the particular block.

In a further embodiment, the target read level is a target read voltage and the one or more control circuits is further configured to divide a voltage range between a largest target read voltage and a smallest target read voltage into approximately equal sized voltage ranges. Define each particular zone to correspond to one of the substantially equal sized non-overlapping voltage ranges.

In a further embodiment, the one or more control circuits is further configured to determine a read level offset for each word line in the particular block. The read level offset being a difference between a base read level and the target read level for the word line. The one or more control circuits is further configured to rank each word line in the particular block in accordance with the read level offset. The one or more control circuits is further configured to assign each word line in the particular block to a zone of the plurality of zones in accordance with a low to high ranking of the read level offsets.

In a further embodiment, the one or more control circuits is further configured to calculate a total offset range as a difference between a largest read level offset and a smallest read level offset of the word lines in the particular block. The one or more control circuits is further configured to divide the total offset range into the plurality of zones. Each zone has approximately equal range of read level offsets.

In a further embodiment, the one or more control circuits are configured to assign the word lines to zones that contain non-consecutive word lines based on the ranking of read levels for the word lines.

In a further embodiment, the one or more control circuits is further configured to calculate the target read level for each set of memory cells in the region. The region comprises a block of memory cells in the memory structure.

In a further embodiment, the one or more control circuits is further configured to: select a number of zones for the plurality of zones; calculate a voltage difference between a highest target read level and a lowest target read level for each set of memory cells in the region; divide the voltage difference by the number of zones to result in a voltage size for each zone; determine a unique read level range for each zone; and assign each particular set of memory cells in the region into one of the zones in accordance with the unique read level range for each zone and the target read level for the particular set of memory cells.

An embodiment includes a method for operating memory. The method comprises calculating a separate read voltage offset for each word line of memory cells in a block of the memory system. The read voltage offset being an offset from a base read voltage. The method comprises ranking the word lines in order from low to high based on the read voltage offsets of the word lines. The method comprises forming zones that each contain word lines having a unique non-overlapping range of read voltage offsets. The method comprises assigning a representative read voltage offset for each zone. The representative read voltage offset for a particular zone being within the range of read voltage offsets for the particular zone. The method comprises reading each particular word line in the block based on the representative read voltage offset for the zone containing the particular word line, including adding the representative read voltage offset for the zone containing the particular word line to the base read voltage.

An embodiment includes a non-volatile storage system comprising blocks having word lines and non-volatile memory cells connected to the word lines. The non-volatile storage system comprises means for assigning each particular word line in a block into a zone of a plurality of zones in accordance with a ranking of read voltage offsets for the memory cells connected to the word lines. The non-volatile storage system comprises means for reading each particular word line in the block based on a representative read voltage offset for the zone into which the particular word line being read was assigned.

In an embodiment, the means for assigning each particular word line in a block into a zone of a plurality of zones in accordance with a ranking of read voltage offsets for the memory cells connected to the word lines comprises one or more of: memory controller 120, system control logic 260, state machine 262, power control 260, interface 268, column control circuitry 210, row control circuitry 220, a processor, FPGA, ASIC, and/or integrated circuit. In an embodiment, the means for assigning each particular word line in a block into a zone of a plurality of zones in accordance with a ranking of read voltage offsets for the memory cells connected to the word lines performs steps 602-606 of process 600, process 700, process 800 and/or process 1100.

In an embodiment, the means for reading each particular word line in the block based on a representative read voltage offset for the zone into which the particular word line being read was assigned comprises one or more of: memory controller 120, system control logic 260, state machine 262, power control 260, interface 268, column control circuitry 210, row control circuitry 220, a processor, FPGA, ASIC, and/or integrated circuit. In an embodiment, the means for reading each particular word line in the block based on a representative read voltage offset for the zone into which the particular word line being read was assigned process 1300.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
one or more control circuits configured to connect to a memory structure having a plurality of physically contiguous regions, each region having a plurality of sets of memory cells, the one or more control circuits configured to:
assign each set of memory cells in a region of the memory structure to a zone of a plurality of zones based on a ranking of a target read level for each set of memory cells in the region; and
read each particular set of memory cells in the region using a representative read level for the zone into which the particular set of memory cells is assigned.

2. The apparatus of claim 1, wherein the one or more control circuits is further configured to:
form the zones to have substantially equal size voltage ranges in target read levels, wherein each zone of the plurality of zones covers a different range of target read levels; and
assign each particular set of memory cells in the region into one of the zones based on the target read level of the particular set of memory cells.

3. The apparatus of claim 1, wherein:
the memory structure comprises a plurality of blocks of memory cells;
each block comprises one of the plurality of physically contiguous regions;
each block has a plurality of word lines;
each set of memory cells in a particular block is connected to a different word line in the particular block; and
the ranking of the target read level for each set of memory cells in the region comprises a ranking of target read levels for the word lines in the particular block.

4. The apparatus of claim 3, wherein the target read level is a target read voltage and the one or more control circuits is further configured to:
divide a voltage range between a largest target read voltage and a smallest target read voltage into substantially equal sized non-overlapping voltage ranges; and
define each particular zone to correspond to one of the approximately equal sized non-overlapping voltage ranges.

5. The apparatus of claim 3, wherein the one or more control circuits is further configured to:
determine a read level offset for each word line in the particular block, the read level offset being a difference between a base read level and the target read level for the word line;
rank each word line in the particular block in accordance with the read level offset; and
assign each word line in the particular block to a zone of the plurality of zones in accordance with a low to high ranking of the read level offsets.

6. The apparatus of claim 5, wherein the one or more control circuits is further configured to:
calculate a total offset range as a difference between a largest read level offset and a smallest read level offset of the word lines in the particular block; and
divide the total offset range into the plurality of zones, each zone having approximately equal range of read level offsets.

7. The apparatus of claim 3, wherein the one or more control circuits are configured to assign the word lines to zones that contain non-consecutive word lines based on the ranking of read levels for the word lines.

8. The apparatus of claim 1, wherein the one or more control circuits is further configured to:
calculate the target read level for each set of memory cells in the region, wherein the region comprises a block of memory cells in the memory structure.

9. The apparatus of claim 1, wherein the one or more control circuits is further configured to:
select a number of zones for the plurality of zones;
calculate a voltage difference between a highest target read level and a lowest target read level for each set of memory cells in the region;
divide the voltage difference by the number of zones to result in a voltage size for each zone;
determine a unique read level range for each zone; and
assign each particular set of memory cells in the region into one of the zones in accordance with the unique read level range for each zone and the target read level for the particular set of memory cells.

10. A method for operating a memory system, the method comprising:
calculating a separate read voltage offset for each word line of memory cells in a block of the memory system, the read voltage offset being an offset from a base read voltage;
ranking the word lines in order from low to high based on the read voltage offsets of the word lines;
forming zones that each contain word lines having a unique non-overlapping range of read voltage offsets;
assigning a representative read voltage offset for each zone, the representative read voltage offset for a particular zone being within the range of read voltage offsets for the particular zone; and
reading each particular word line in the block based on the representative read voltage offset for the zone containing the particular word line, including adding the representative read voltage offset for the zone containing the particular word line to the base read voltage.

11. The method of claim 10, wherein forming the zones that each contain word lines having a unique range of read voltage offsets includes:
forming at least one zone that contains a physically non-contiguous set of word lines.

12. The method of claim 10, wherein forming the zones that each contain word lines having a unique range of read voltage offsets includes:
forming zones that each have substantially the same voltage gap in their respective unique range of read voltage offsets.

13. The method of claim 10, wherein forming the zones that each contain word lines having a unique range of read voltage offsets includes:
dividing a total range of read voltage offsets for all word lines in the block approximately equally to each zone.

14. The method of claim 10, wherein forming the zones that each contain word lines having a unique range of read voltage offsets includes:
selecting a number of zones for the block; and
forming zones that each contain word lines to minimize a voltage gap in read voltage offsets in each zone given the number of zones.

15. The method of claim 10, wherein forming the zones that each contain word lines having a unique contiguous range of read voltage offsets includes:

selecting a number of zones to use for the block;
calculating a total read voltage offset range for the word lines in the block;
dividing the total read voltage offset range by the number of zones to arrive at a voltage gap per zone;
defining a lower read voltage offset and an upper read voltage offset for each zone based on the voltage gap per zone; and
assigning each particular word line into one of the zones based on the read voltage offset for the particular word line.

16. A non-volatile storage system, comprising:
blocks having word lines and non-volatile memory cells connected to the word lines;
means for assigning each particular word line in a block into a zone of a plurality of zones in accordance with a ranking of read voltage offsets for the memory cells connected to the word lines; and
means for reading each particular word line in the block based on a representative read voltage offset for the zone into which the particular word line being read was assigned.

17. The non-volatile storage system of claim 16, wherein the means for assigning each particular word line in the block into a zone of a plurality of zones in accordance with a ranking of read voltage offsets for the memory cells connected to the word lines is configured to:
divide a voltage range between a largest read voltage offset and a smallest read voltage offset into substantially equal sized zones; and
assign each word line in the block in into one of the zones based on the read voltage offsets of the particular word line.

18. The non-volatile storage system of claim 16, wherein the means for assigning each particular word line in the block into a zone of a plurality of zones in accordance with a ranking of read voltage offsets for the memory cells connected to the word lines is configured to:
calculate a total read voltage offset range as a difference between a largest read voltage offset and a smallest read voltage offset of the word lines in the block;
divide the total read voltage offset range into the plurality of zones, each zone having approximately equal gap in read voltage offsets; and
assign each particular word line in the block into a zone of the plurality of zones based on the read voltage offsets of the particular word line.

19. The non-volatile storage system of claim 16, wherein the wherein the means for assigning each particular word line in the block into a zone of a plurality of zones in accordance with a ranking of read voltage offsets for the memory cells connected to the word lines is configured to:
select a number of zones;
calculate a difference between a highest read level offset and a lowest read level offset for the word lines in the block;
divide the difference by the number of zones to result in a read level offset gap;
determine a read voltage offset range for each zone; and
assign each particular word line in the block into one of the zones in accordance with a read voltage offset range for each zone and the read voltage offset for the particular word line.

20. The non-volatile storage system of claim 16, wherein the means for reading each particular word line in the block based on the representative read voltage offset for the zone into which the particular word line being read was assigned is configured to:
add the read voltage offset for the zone into which the particular word line being read was assigned to an optimal read voltage of a reference word line in the block.

* * * * *